(12) United States Patent
Wagner

(10) Patent No.: US 12,171,364 B2
(45) Date of Patent: Dec. 24, 2024

(54) ADJUSTABLE GRILL

(71) Applicant: Daniel John Wagner, Cassopolis, MI (US)

(72) Inventor: Daniel John Wagner, Cassopolis, MI (US)

( * ) Notice: Subject to any disclaimer, the term of this patent is extended or adjusted under 35 U.S.C. 154(b) by 797 days.

(21) Appl. No.: 17/203,078

(22) Filed: Mar. 16, 2021

(65) Prior Publication Data

US 2021/0289985 A1 Sep. 23, 2021

Related U.S. Application Data

(60) Provisional application No. 62/990,592, filed on Mar. 17, 2020.

(51) Int. Cl.
*A47J 33/00* (2006.01)
*A47J 37/07* (2006.01)

(52) U.S. Cl.
CPC ............ *A47J 33/00* (2013.01); *A47J 37/0763* (2013.01); *A47J 2037/0795* (2013.01)

(58) Field of Classification Search
CPC .................................. A47J 33/00; A47J 33/07
See application file for complete search history.

(56) References Cited

U.S. PATENT DOCUMENTS

| | | | | |
|---|---|---|---|---|
| 758,015 A * | 4/1904 | Miller | ..................... | A47J 33/00 126/30 |
| 1,666,293 A * | 4/1928 | Lorton | ..................... | A47J 33/00 126/30 |
| 2,010,299 A * | 8/1935 | Gray | ..................... | A47B 91/028 248/188.4 |
| 2,472,065 A * | 6/1949 | Cottingham | ......... | A63B 21/015 473/229 |
| 2,960,979 A * | 11/1960 | Stone | .................. | A47J 37/0772 126/30 |
| D191,186 S * | 8/1961 | Maki | ............................ | D7/336 |
| 3,045,660 A * | 7/1962 | Manley | ............... | A47J 37/0763 126/30 |
| 3,152,536 A * | 10/1964 | Lucas | ................ | A47J 37/0763 126/30 |
| 3,344,780 A * | 10/1967 | Anderson | ........... | A47J 37/0763 126/30 |
| 3,483,816 A * | 12/1969 | Lombardi | ............... | A47J 33/00 126/30 |
| 3,662,980 A * | 5/1972 | Kantor | .................. | F16M 11/28 248/188.7 |
| 3,785,360 A * | 1/1974 | Martin | ................ | A47J 37/0763 126/30 |

(Continued)

*Primary Examiner* — Sean M Michalski
(74) *Attorney, Agent, or Firm* — Larry E. Henneman, Jr.; Henneman & Associates, PLC

(57) ABSTRACT

A portable grill includes a base frame, a set of transverse stabilizers, a support column, a height adjustment assembly, and a cooking platform. The base frame and the transverse stabilizers are configured to rest on a supporting surface. The support column extends upwardly from the base frame. The height adjustment assembly moves up and down the support column and can be selectively fixed in multiple positions along the support column. The cooking platform is coupled to said height adjustment assembly and oriented such that a center of the cooking platform is disposed over a region of the supporting surface between an adjacent pair of the transverse stabilizers.

20 Claims, 26 Drawing Sheets

(56) References Cited

U.S. PATENT DOCUMENTS

| | | | | |
|---|---|---|---|---|
| 3,791,368 A | * | 2/1974 | Hunt | F24C 1/06 126/25 A |
| 4,230,089 A | * | 10/1980 | Barden | A47J 33/00 126/30 |
| 4,488,535 A | * | 12/1984 | Johnson | A47J 37/0763 126/25 A |
| 4,538,589 A | * | 9/1985 | Preston | A47J 33/00 126/30 |
| 4,548,193 A | * | 10/1985 | Marogil | F24B 1/205 126/30 |
| 4,634,090 A | * | 1/1987 | Currie | G10H 1/32 984/344 |
| 4,667,651 A | * | 5/1987 | Groeneweg | F24B 1/207 126/25 R |
| 4,685,645 A | * | 8/1987 | Cattaneo | A47B 95/00 248/188.4 |
| 4,719,898 A | * | 1/1988 | Stanislawski | F24B 1/205 126/30 |
| 4,796,599 A | * | 1/1989 | Cooper | A47J 33/00 126/30 |
| 4,854,297 A | * | 8/1989 | Shuman | A47J 37/0763 126/30 |
| 4,856,423 A | * | 8/1989 | Burns | A47J 33/00 126/30 |
| 4,896,651 A | * | 1/1990 | Kott, Jr. | F24B 1/205 126/30 |
| 4,979,490 A | * | 12/1990 | Nudo | F24B 1/205 126/30 |
| 5,004,188 A | * | 4/1991 | Donneky | B64F 1/3055 14/71.3 |
| 5,022,137 A | * | 6/1991 | Sorensen | B25B 5/067 29/559 |
| 5,117,806 A | * | 6/1992 | Soat | A47J 33/00 99/449 |
| 5,215,321 A | * | 6/1993 | Ljungberg | B62B 5/0083 280/47.131 |
| 5,307,797 A | * | 5/1994 | Kleefeld | A47J 33/00 126/30 |
| 5,355,867 A | * | 10/1994 | Hall | A47J 33/00 126/30 |
| 5,558,008 A | * | 9/1996 | Jenkins | A47J 37/0786 126/30 |
| 5,575,195 A | * | 11/1996 | Foxford | A47J 37/0763 99/449 |
| 5,666,940 A | * | 9/1997 | Kreiter | F24B 1/205 126/30 |
| 5,730,114 A | * | 3/1998 | Fabrikant | A47J 37/0709 219/453.11 |
| 5,819,718 A | * | 10/1998 | Leiser | A47J 33/00 126/30 |
| 5,819,720 A | * | 10/1998 | Schubert | A47J 37/0763 126/41 R |
| 5,848,584 A | * | 12/1998 | Brog | A47J 33/00 126/30 |
| 5,862,742 A | * | 1/1999 | Bjerg | A47J 33/00 126/30 |
| 5,944,009 A | * | 8/1999 | Scheller | A47J 33/00 126/30 |
| 6,006,740 A | * | 12/1999 | Ulrickson | F24B 1/205 126/29 |
| 6,070,571 A | * | 6/2000 | Bradbury | A47J 37/0772 126/30 |
| 6,105,569 A | * | 8/2000 | Andress | A47J 33/00 126/30 |
| 6,386,192 B1 | * | 5/2002 | Weber | A47J 33/00 126/30 |
| 6,419,598 B1 | * | 7/2002 | Winter | A63B 63/083 473/483 |
| 6,481,343 B1 | * | 11/2002 | Rigney | A47J 37/0786 99/450 |
| 6,578,568 B1 | * | 6/2003 | Dufort | F24B 1/205 126/30 |
| 6,584,967 B1 | * | 7/2003 | Paumen | A47J 33/00 126/30 |
| 6,640,797 B1 | * | 11/2003 | Magers | F24B 1/205 126/30 |
| 6,895,958 B1 | * | 5/2005 | Komosky | F24B 1/182 126/29 |
| 7,004,160 B1 | * | 2/2006 | Bates | A47J 33/00 126/30 |
| 7,013,885 B2 | * | 3/2006 | Czajkoski | F24B 1/182 126/30 |
| 7,077,366 B2 | * | 7/2006 | Young | G03B 37/02 248/156 |
| 7,182,370 B2 | * | 2/2007 | Arnold | B60R 22/203 280/801.2 |
| D592,443 S | * | 5/2009 | Fraser | D7/335 |
| 7,779,828 B2 | * | 8/2010 | Lu | A47J 37/074 126/29 |
| 8,151,784 B2 | * | 4/2012 | Czajkoski | F24B 1/182 126/30 |
| 8,181,797 B2 | * | 5/2012 | Edwards | A47B 81/00 211/195 |
| 8,304,700 B1 | * | 11/2012 | Eilers | A47J 37/0694 392/347 |
| 8,931,293 B2 | * | 1/2015 | Shei | A47J 36/2483 219/385 |
| 9,010,312 B1 | * | 4/2015 | Rinderle | A47J 33/00 126/30 |
| 9,770,087 B2 | * | 9/2017 | Head | A45F 3/44 |
| 10,555,638 B2 | * | 2/2020 | Maga | A47J 33/00 |
| 10,709,293 B1 | * | 7/2020 | Nathans | C08J 11/14 |
| 11,278,153 B2 | * | 3/2022 | Stoltzfus | F24C 15/08 |
| D961,321 S | * | 8/2022 | Lam | D7/334 |
| 11,540,665 B1 | * | 1/2023 | Santele | A47J 37/049 |
| 2002/0148940 A1 | * | 10/2002 | Lee | F16M 13/02 248/352 |
| 2003/0209899 A1 | * | 11/2003 | Arnold | B60R 22/203 280/801.2 |
| 2004/0011161 A1 | * | 1/2004 | Gmeilbauer | B25B 25/005 81/9.3 |
| 2004/0016349 A1 | * | 1/2004 | Robertson | A47J 37/0763 99/449 |
| 2004/0020887 A1 | * | 2/2004 | Jersey | A47B 45/00 211/189 |
| 2004/0144379 A1 | * | 7/2004 | Lewis | A47J 33/00 126/30 |
| 2004/0207191 A1 | * | 10/2004 | Arnold | B60R 22/203 280/801.2 |
| 2007/0023028 A1 | * | 2/2007 | Mortensen | F24B 1/205 126/30 |
| 2008/0216809 A1 | * | 9/2008 | Begotka | A47J 33/00 126/30 |
| 2009/0025569 A1 | * | 1/2009 | Hatjopoulos | A47J 45/02 99/356 |
| 2010/0314914 A1 | * | 12/2010 | Mazzola | A47C 7/008 297/16.2 |
| 2017/0265679 A1 | * | 9/2017 | Flick | A47J 33/00 |
| 2018/0184840 A1 | * | 7/2018 | Maga | A47J 33/00 |
| 2020/0077840 A1 | * | 3/2020 | White | A47J 37/0763 |

* cited by examiner

ADJUSTABLE GRILL

RELATED APPLICATIONS

This application claims the benefit of priority to U.S. Provisional Patent Application 62/990,592, which was filed on Mar. 17, 2020 by the same inventor, and which is incorporated herein by reference in its entirety.

BACKGROUND OF THE INVENTION

Field of the Invention

This invention relates generally to grills, and more particularly to campfire grills.

Description of the Background Art

Campfire grills are commonly used to cook over open campfires. Such grills typically include a grate suspended over a fire pit by some suitable means such as, for example, legs, stacked rocks/bricks, etc. One challenge with the current campfire grills is that their grates remain stationary above the fire. This makes it difficult to control the temperature of the food while grilling. Another challenge is that such grills are typically bulky, heavy, and otherwise difficult to transport.

What is needed, therefore, is a campfire grill that is adapted for temperature control and is more portable.

SUMMARY

The present invention overcomes the problems associated with the prior art, by providing a freestanding campfire grill having an adjustable height grate. A example portable grill includes a base frame, a set of transverse stabilizers, a support column, a height adjustment assembly, and a cooking platform. The base frame is configured to rest on a supporting surface (e.g., the ground). Each transverse stabilizer can be coupled to the base frame to extend transversely from the base frame in a different direction, and can be oriented to rest upon the supporting surface. The support column can be coupled to the base frame and extend from the base frame in an upward direction. The height adjustment assembly can be coupled to move up and down the support column and can be configured to be selectively fixed in multiple positions along the support column. The cooking platform can be coupled to the height adjustment assembly and oriented such that a center of the cooking platform is disposed over a region of the supporting surface disposed between an adjacent pair of the transverse stabilizers.

In an example portable grill, the height adjustment assembly is rotatable about the support column. The height adjustment assembly can be rotatable 360 degrees about the support column. The cooking platform includes a center portion, and each of the transverse stabilizers includes a distal end and a proximal end. Each of the proximal ends of the transverse stabilizers can be coupled to the base frame. The distance between each of the distal ends of the transverse stabilizers and the support column remains greater than the distance between the center portion of the cooking platform and the support column as the height adjustment assembly is rotated about the support column.

In an example portable grill, the transverse stabilizers can be detachably coupled to the frame base. Each of the transverse stabilizers includes a proximal end and an opposite distal end. The frame base can include a plurality of receivers, each of the receivers being configured to receive a respective one of the proximal ends. The set of transverse stabilizers can include a first transverse stabilizer extending along a first axis, a second transvers stabilizer extending along a second axis, and a third transverse stabilizer extending along a third axis. The first axis, the second axis, and the third axis can lie substantially within a single plane. The support column can extend along a fourth axis, and the fourth axis can be substantially perpendicular to the single plane.

In an example portable grill, the set of transverse stabilizers can include a first transverse stabilizer, a second transverse stabilizer, and a third transverse stabilizer. The angle formed by the first transverse stabilizer and the second transverse stabilizer can be the same as the angle formed by the first transverse stabilizer and the third transverse stabilizer. In addition, the angle formed by the second transverse stabilizer and the third transverse stabilizer can be the same as the angle formed by the first transverse stabilizer and the second transverse stabilizer.

An example portable grill can include a handle. The support column can include a bottom end portion, an opposite top end portion, and an intermediate portion disposed between the bottom end portion and the top end portion. The bottom end portion of the support column can be coupled to the base frame, and the handle can be coupled to the top end portion of the support column. The height adjustment assembly can be coupled to the intermediate portion of the support column, and the cooking platform can be disposed above the base frame and below the handle.

In an example portable grill, the height adjustment assembly can include a locking mechanism configured to transition between a locked position and an unlocked position. The height of the height adjustment assembly can be fixed when the locking mechanism is in the locked position, and the height adjustment assembly can be free to move up and down the support column when the locking mechanism is in the unlocked position. The locking mechanism can be configured to transition from the locked position to the unlocked position responsive to an application of force by a user, and the locking mechanism can be configured to automatically return to the locked position responsive to cessation of the force by the user. In a particular example portable grill, the locking mechanism includes a first plate, a second plate, and a biasing member. The first plate defines a first aperture and includes a first edge hingably coupled to the height adjustment assembly. The second plate defines a second aperture and includes a second edge hingably coupled to the height adjustment assembly. The support column is disposed through both the first aperture and the second aperture. The biasing member is disposed to urge the first plate away from the second plate, thereby causing a portion of the first plate that defines the first aperture to engage the support column and causing a portion of the second plate that defines the second aperture to engage the support column. The engagement of the support column by the portion of the first plate and the portion of the second plate locks the height adjustment assembly in place on the support column. The application of force by the user can move the first plate toward the second plate, thereby causing the portion of the first plate and the portion of the second plate to disengage the support column. The disengagement of the support column by the portion of the first plate and the portion of the second plate allows the height adjustment assembly to move along the support column.

In an example portable grill, the cooking platform can be detachable from the height adjustment assembly. The cooking platform can also include a grate.

In an example portable grill, the support column can include a radial exterior surface and/or a circular cross-section. The support column can be tubular, each of the transverse stabilizers can be tubular, and the base frame can be tubular.

In an example portable grill, at least one of the transverse stabilizers can extend along an axis and include a proximal end and an opposite distal end. The base frame can include a receiver configured to engage the proximal end of the transverse stabilizer, and the distal end of the transverse stabilizer can include a leveling protrusion configured to engage the supporting surface. The transverse stabilizer can be rotatable about the axis, and rotation of the transverse stabilizer can cause the orientation of the leveling protrusion about the axis to change. Changing the orientation of the leveling protrusion about the axis can facilitate adjustment of an angle between the transverse stabilizer and the supporting surface.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a freestanding campfire grill having an adjustable height grate. In the following description, numerous specific details are set forth (e.g., materials, structural components, fasteners, etc.) in order to provide a thorough understanding of the invention. Those skilled in the art will recognize, however, that the invention may be practiced apart from these specific details. In other instances, details of well-known metal fabricating practices (e.g., welding, cutting, bending, etc.) and components have been omitted, so as not to unnecessarily obscure the present invention.

Figure 1:
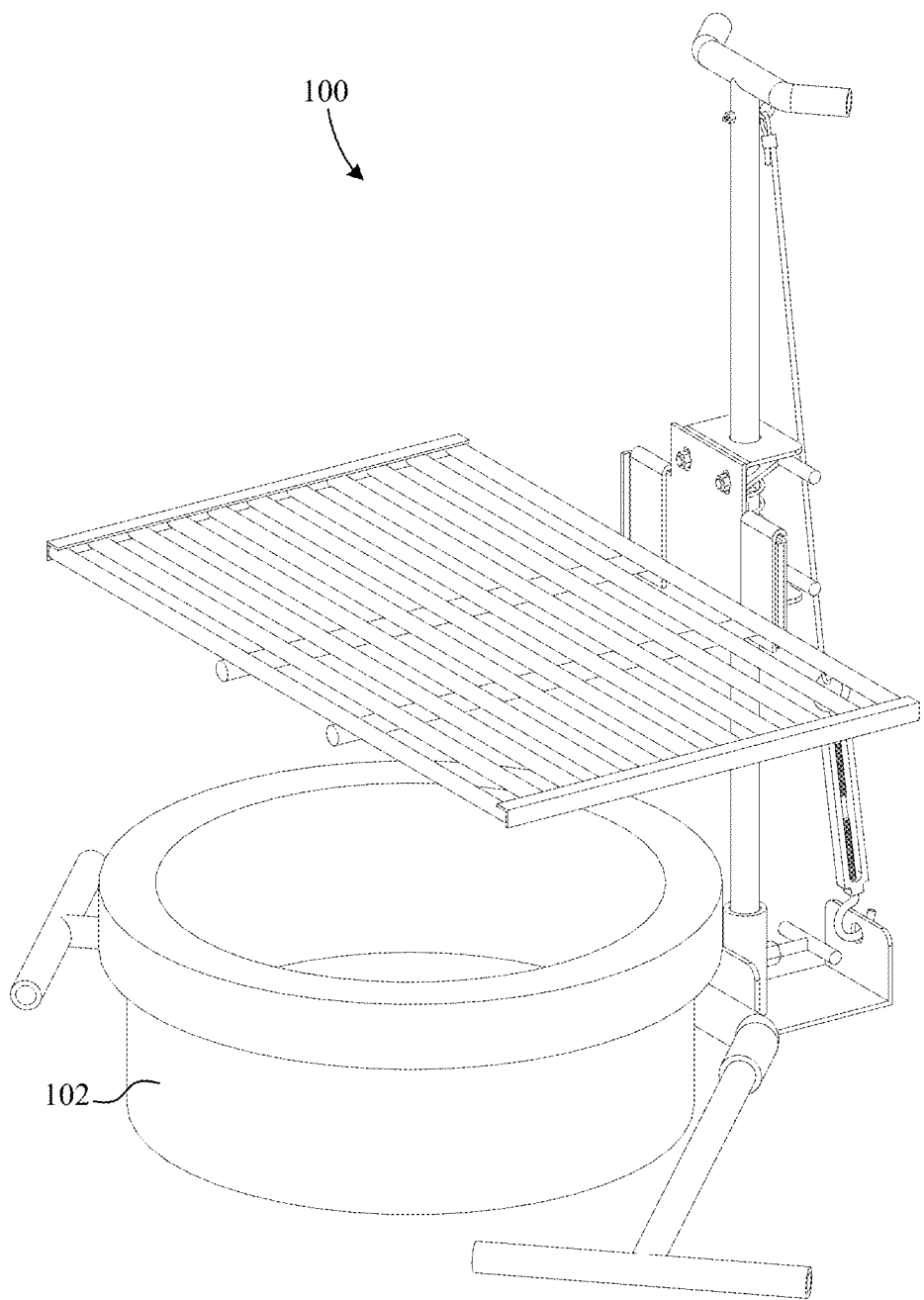
FIG. 1 shows a front perspective view of a grill positioned over a fire ring.

FIG. 1 shows a front perspective view of a freestanding campfire grill 100 positioned over, and partially around, a fire ring 102. Grill 100 facilitates the cooking, heating, and/or smoking of food and/or other things (e.g. pot of water) over a campfire contained within ring 102. Grill 100 is vertically adjustable such that the cooking temperature of the food can be controlled.

Figure 2:
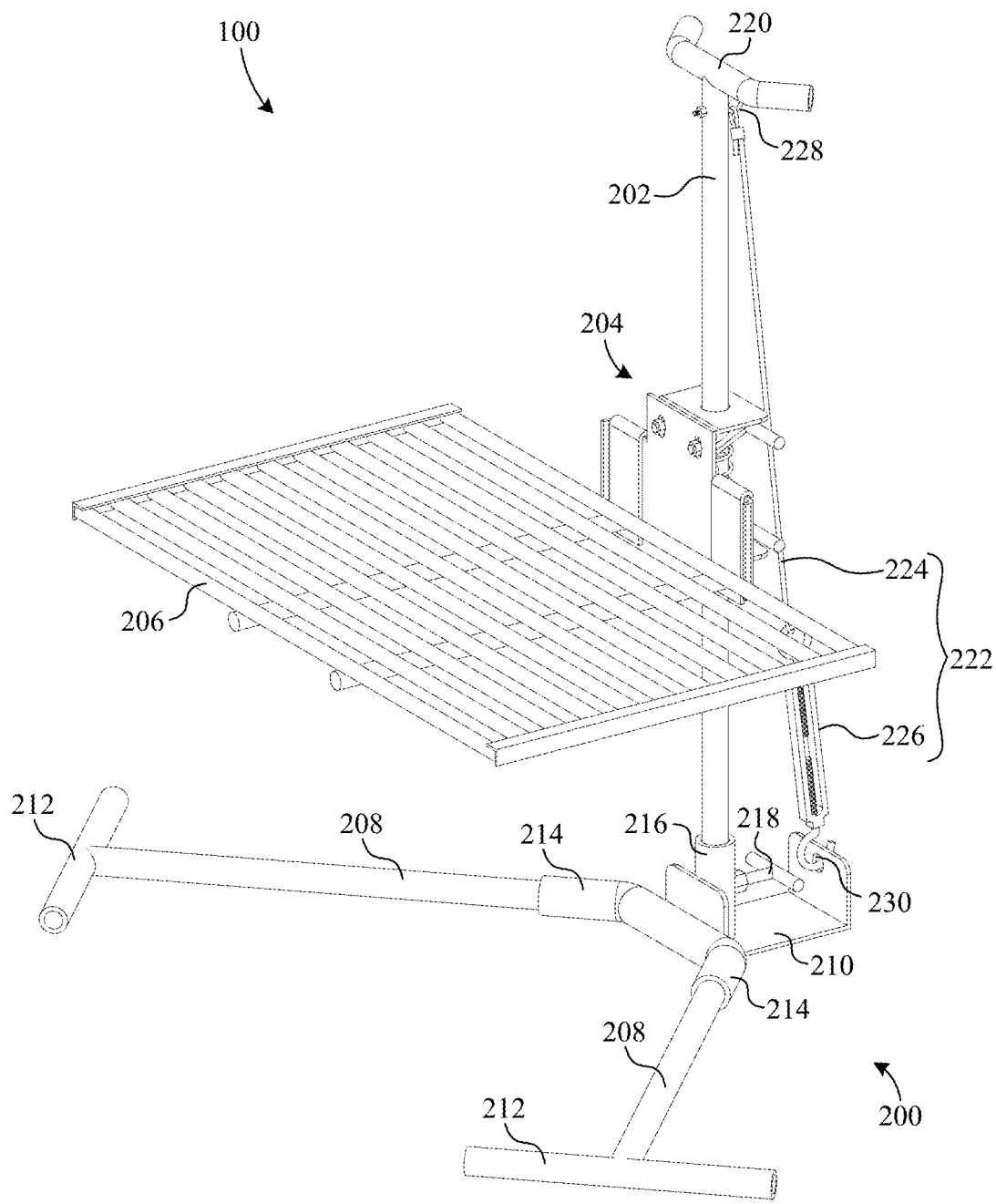
FIG. 2 shows a front perspective view of the grill of FIG. 1.

FIG. 2 shows a front perspective view of grill 100, which includes a base assembly 200, a vertical support column 202, a height adjustment assembly 204, and a grate 206. In the example embodiment, base assembly 200, column 202, height adjustment assembly 204, and grate 206 are all formed entirely from stainless steel, so that grill 100 is entirely resistant to high temperatures associated with campfires that could otherwise cause grill 100 to rust.

Base assembly 200 is configured to rest on a surface (i.e. the ground) to facilitate the stabilization of grill 100. Base assembly 200 includes a set of stabilizers 208 removably attached to a frame 210. Each of stabilizers 208 includes a respective foot 212 extending perpendicularly therefrom, to further stabilize grill 100. Frame 210 includes a set of sockets 214 and a socket 216 extending substantially horizontally and vertically, respectively, therefrom. Stabilizers 208 are removably disposed in sockets 214, and column 202 is removably disposed in socket 216. Socket 216 further includes a compression screw 218 that, when tightened, engages the side radial surface of column 202 to lock column 202 into socket 216 when tightened. Of course, untightening screw 218 allows column 202 to be released from frame 210.

Column 202 extends upwardly from base assembly 200 and provides structural support to height adjustment assembly 204 and, therefore, grate 206. In this example, column 202 is tube having a non-circular (oval, polygonal, etc.) cross-section which prevents height adjustment assembly 204 and grate 206 from rotating about column 202. Column 202 further includes a handle 220 which facilitates movement of assembled grill 100 by the user via lifting, twisting, tilting, pushing, pulling, etc.

Height adjustment assembly 204 is coupled to adjustably slide along column 202, to facilitate the vertical adjustment of grate 206 over an underlying campfire. The fixed position of assembly 204 along column 202 is, thereby, continuously adjustable.

Grate 206 provides a surface to cook, heat, and/or smoke objects over an underlying fire. Grate 206 is removably coupled to assembly 204. The removable coupling allows grate 206 to be selectively removed from the rest of grill 100 without having to move the rest of grill 100 away from the fire.

Grill 100 further includes a tensioner 222 to counteract the bending force exerted on column 202 by the weight of assembly 204, grate 206, and anything resting thereon. Tensioner 222 includes a cable 224 and a turnbuckle 226. Cable 224 includes a first end coupled to an anchor 228 that is attached to the top portion of column 202 and a second end coupled to the top eye of turnbuckle 226. In this example, anchor 228 is an eye bolt fastened to column 202 with a complementary nut. The bottom hook of turnbuckle 226 is disposed through an aperture 230 passing through frame 210. As turnbuckle 226 is turned, the tension in cable 224 is increased thereby preventing column 202 from bending toward grate 206. When turnbuckle 226 is turned in an opposite direction, the tension in cable 224 is relaxed, so that turnbuckle 226 can be disengaged from frame 210. Optionally, tensioner 222 may be omitted and column 202 may be reinforced (e.g., increased diameter of column 202, increased wall thickness of column 202, etc.) to prevent column 202 from bending when grate 206 is loaded.

Figure 3:
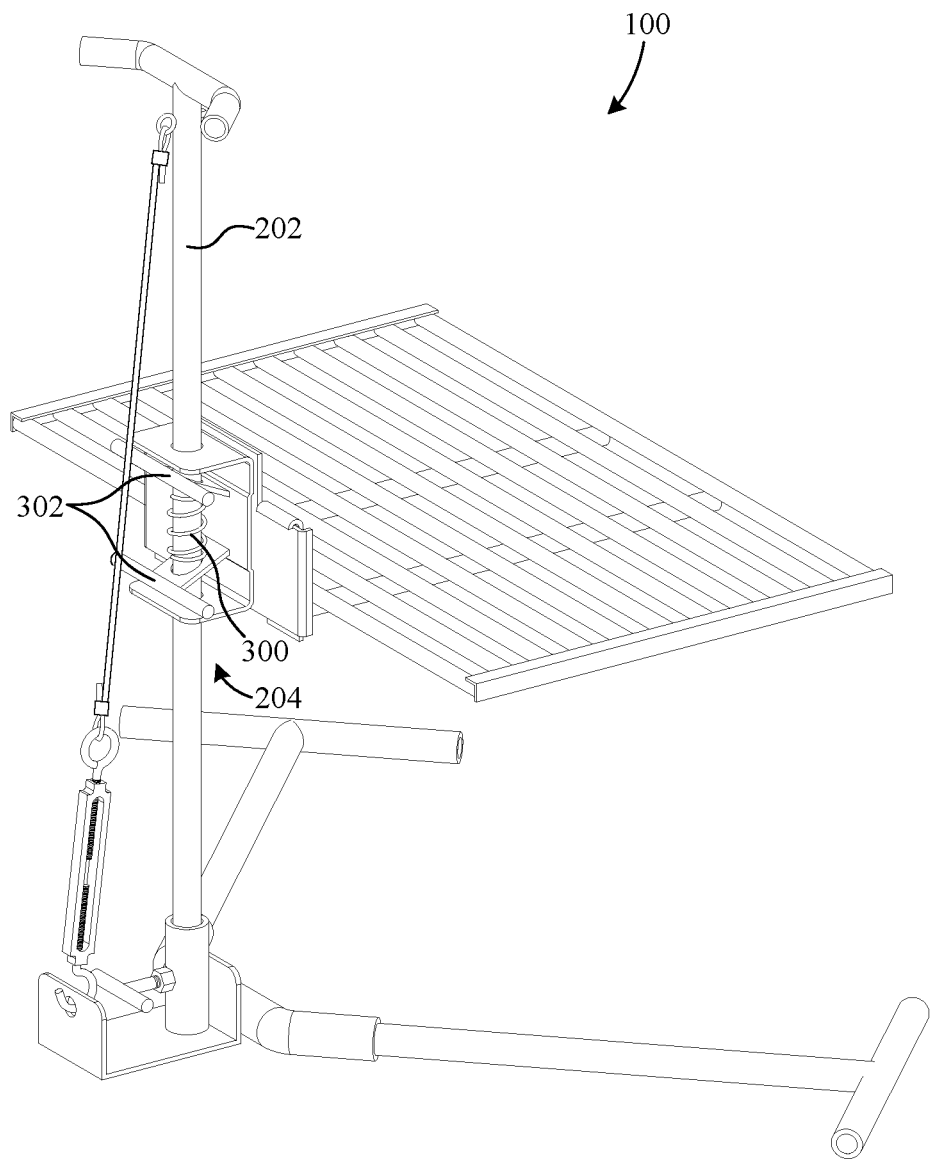
FIG. 3 shows a rear perspective view of the grill of FIG. 1.

FIG. 3 is a rear perspective view of grill 100 showing additional details of height adjustment assembly 204. More specifically, height adjustment assembly 204 includes a spring 300 interposed between two hinge plates 302. Spring 300 is positioned around column 202 and is adapted to urge plates 302 away from one another. When plates 302 are urged together by a user, they disengage column 202, thereby freeing assembly 204 to slide up or down along column 202. When plates 302 are released, spring 300 urges them away from one another, thereby causing plates 302 to bite into column 202 and fix assembly 204 to column 202. In other words, when plates 302 are urged together, assembly 204 and grate 206 can be moved to a desired height along column 202, and when plates 302 are not urged together, assembly 204 remains fixed with respect to column 202.

Figure 4:
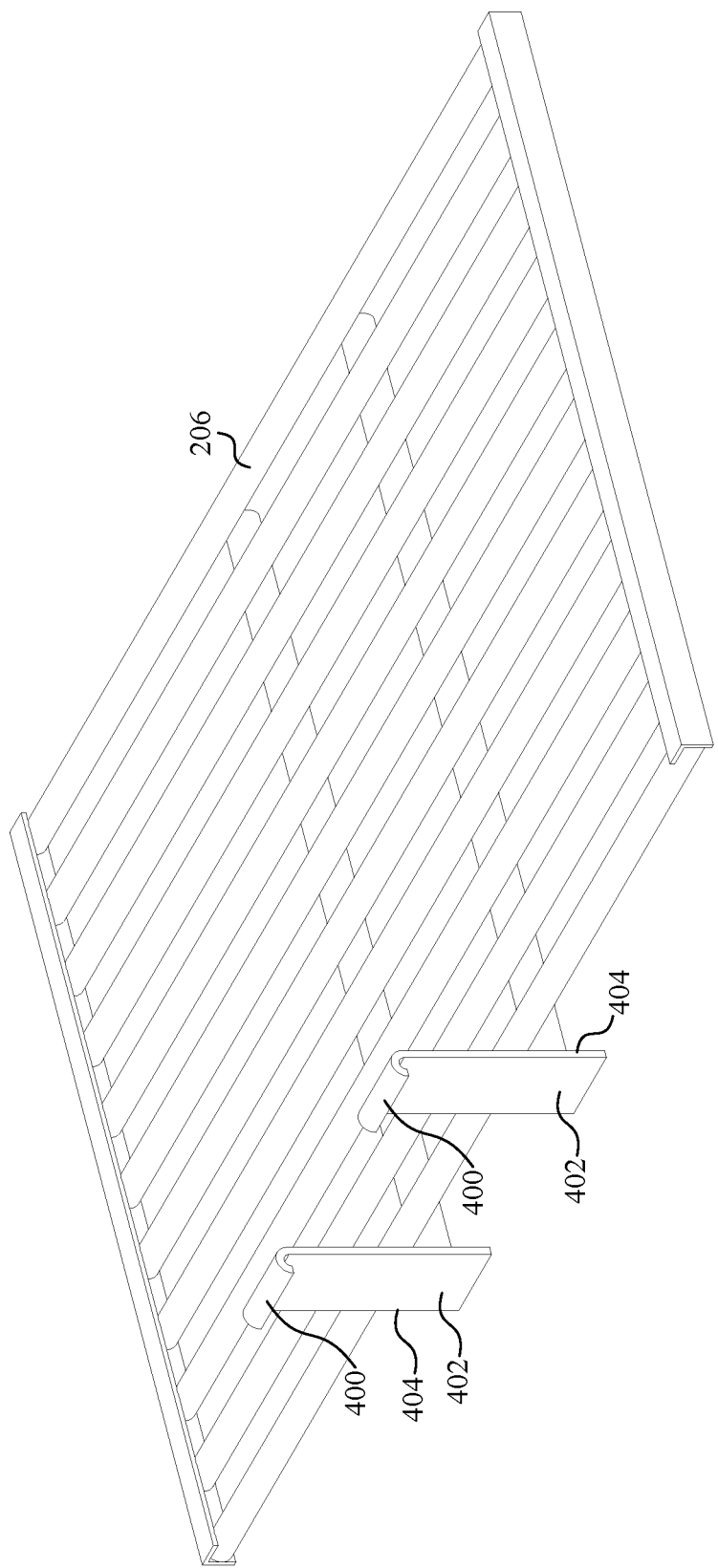
FIG. 4 shows a rear perspective view of a grate of the grill of FIG. 1.

FIG. 4 shows a rear perspective view of grate 206 removed from assembly 204. Grate 206 includes a set of hooks 400 and a respective set of abutment surfaces 402. Hooks 400 are adapted to engage height adjustment assembly 204, while height adjustment assembly 204 imparts a stabilizing horizontal force onto abutment surfaces 402. As a result, grate 206 remains level when attached to height adjustment assembly 204. When coupled to height adjustment assembly 204, grate 206 is held in place at least partially by gravity. This allows grate 206 to be removed by simply lifting grate 206 upward, disengaging hooks 400, and lifting grate 206 away from height adjustment assembly 204. Grate 206 further includes a set of side surfaces 404, which are used to restrain lateral movement of grate 206, which will be explained with reference to FIG. 5 below.

Figure 5:
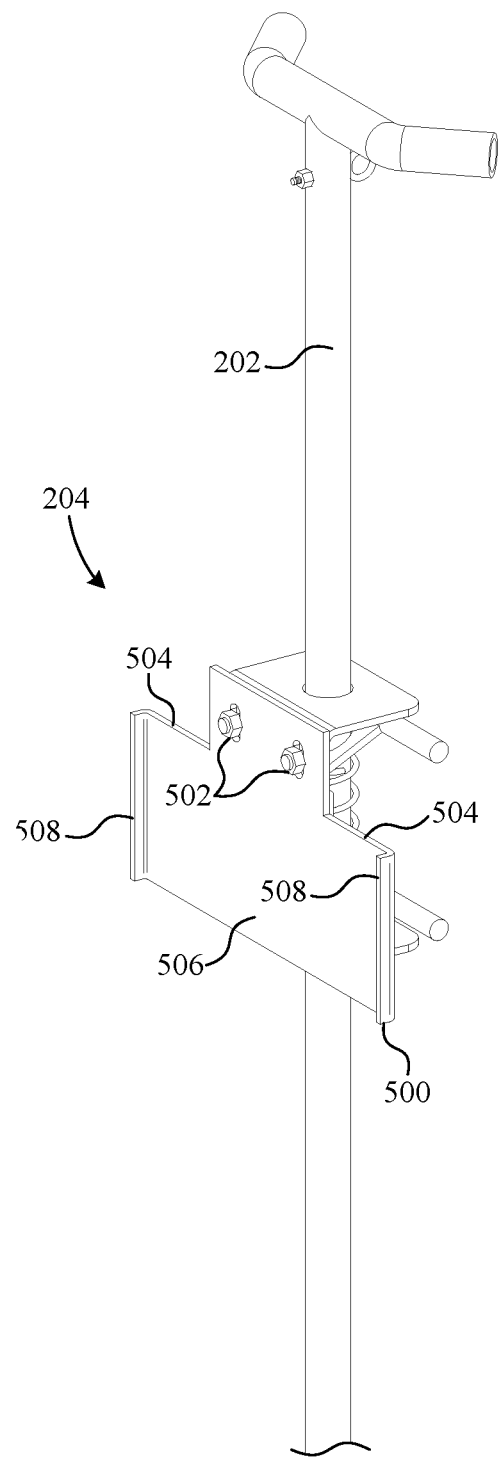
FIG. 5 shows a front perspective view of a vertical support column and a height adjustment assembly of the grill of FIG. 1.

FIG. 5 shows a front perspective view of height adjustment assembly 204 coupled to column 202. In addition to previously described elements, height adjustment assembly 204 includes a coupler plate 500 attached thereto via a set of bolts 502. Optionally, coupler plate 500 can be permanently fixed (e.g., welded, made integral, etc.) to height adjustment assembly 204. Plate 500 facilitates the removable attachment of grate 206 to height adjustment assembly 204. Plate 500 includes a set of horizontal surfaces 504 (e.g., top edges of coupler plate 500), a vertical surface 506, and a set of side lips 508. Surfaces 504 are engaged by hooks 400, when grate 206 is attached to height adjustment assembly 204. Surface 506 abuts surfaces 402 of grate 206, when grate 206 is attached to assembly 204. When hooks 400 hang on horizontal surfaces 504 to support grate 206, the abutment of surface 506 and surfaces 402 (FIG. 4) prevents the rotation of grate 206 and maintains grate 206 in an approximately level orientation. Lips 508 are configured to restrain surfaces 404 of grate 206 therebetween, to further stabilize and limit lateral motion of grate 206.

Figure 6:
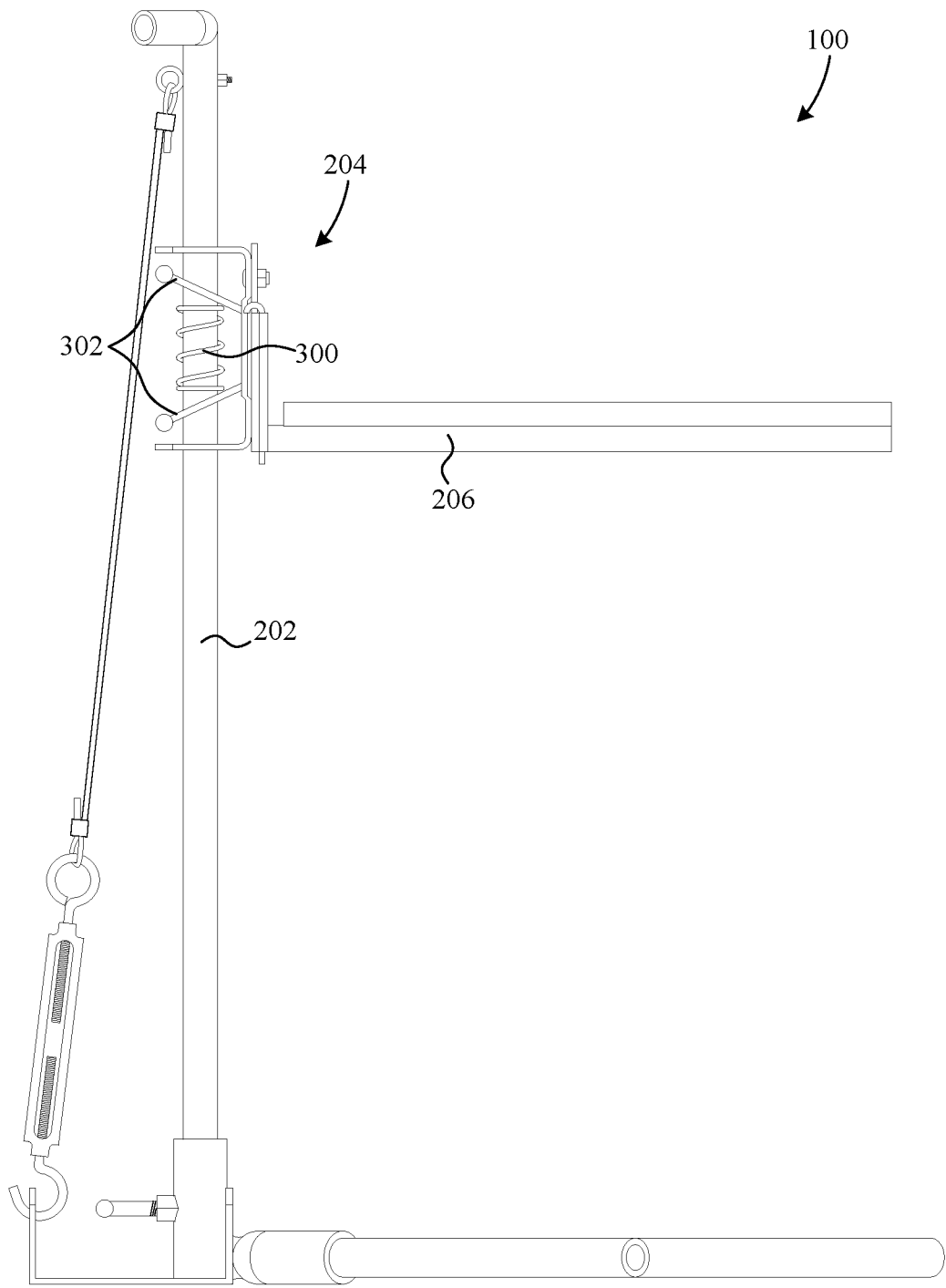
FIG. 6 shows a side view of the grill of FIG. 1 in a raised, fixed position.

FIG. 6 shows a side view of grill 100, with grate 206 in a substantially elevated position. That is, height adjustment assembly 204 and, therefore, grate 206 are fixed near an upper portion of column 202. As previously mentioned, plates 302 are urged away from one another via spring 300 when assembly 204 is in a fixed position.

Figure 7:
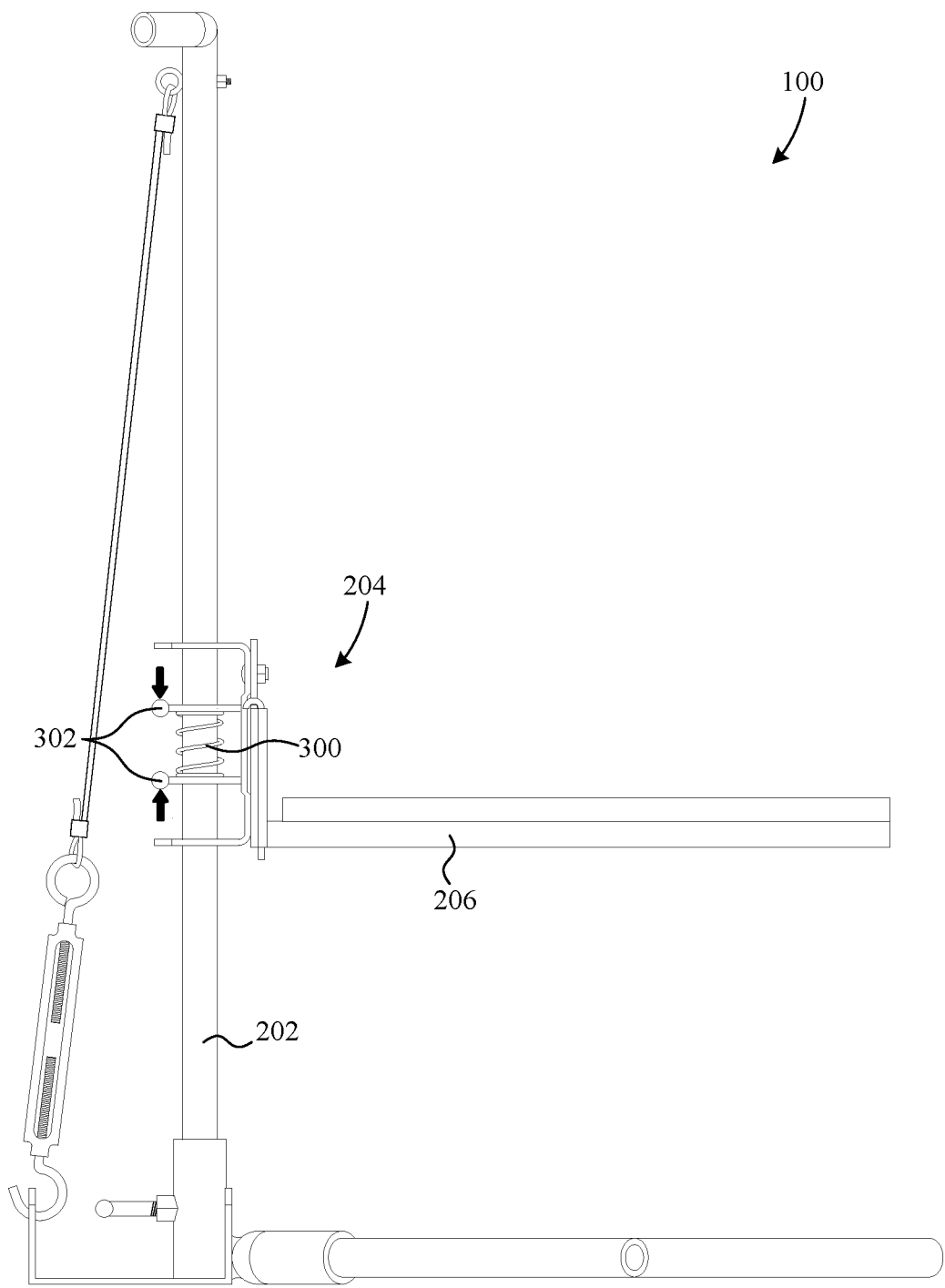
FIG. 7 shows a side view of the grill of FIG. 1 with the height adjustment assembly being moved with respect to the column.

FIG. 7 shows a side view of grill 100, while the position of height adjustment assembly 204 with respect to column 202 is being changed. During such a transition, plates 302 are urged together, thereby compressing spring 300 and allowing height adjustment assembly to freely slide along column 202.

Figure 8:
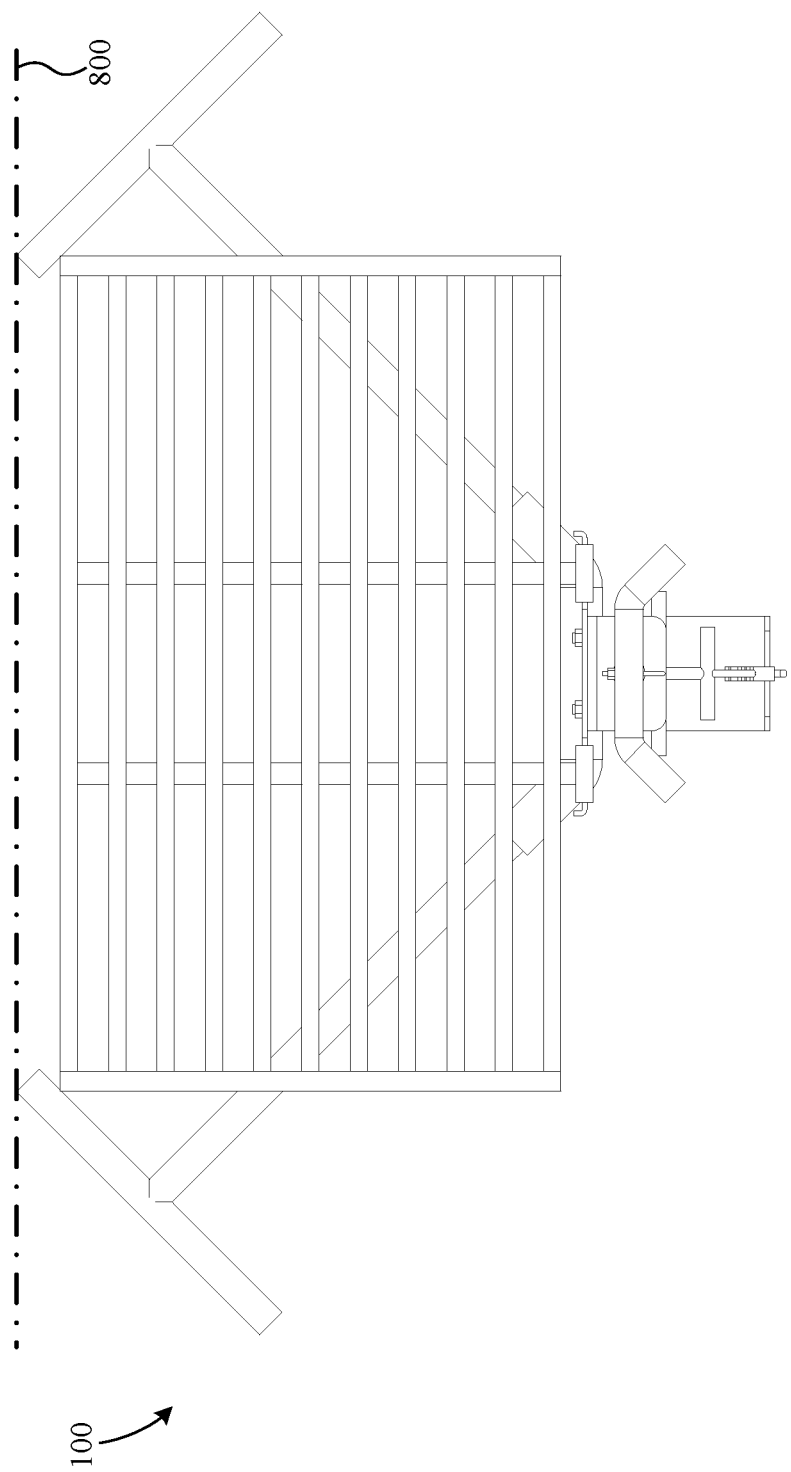
FIG. 8 shows a top view of the grill of FIG. 1.

FIG. 8 shows a top view of grill 100. Regardless of where a downward load is located on grate 206, the center of gravity cannot extend beyond the dashed line 800. As a result, grill 100 cannot tip forward when a load is applied to grate 206 and, therefore, remains very stable when used for cooking.

Figure 9:
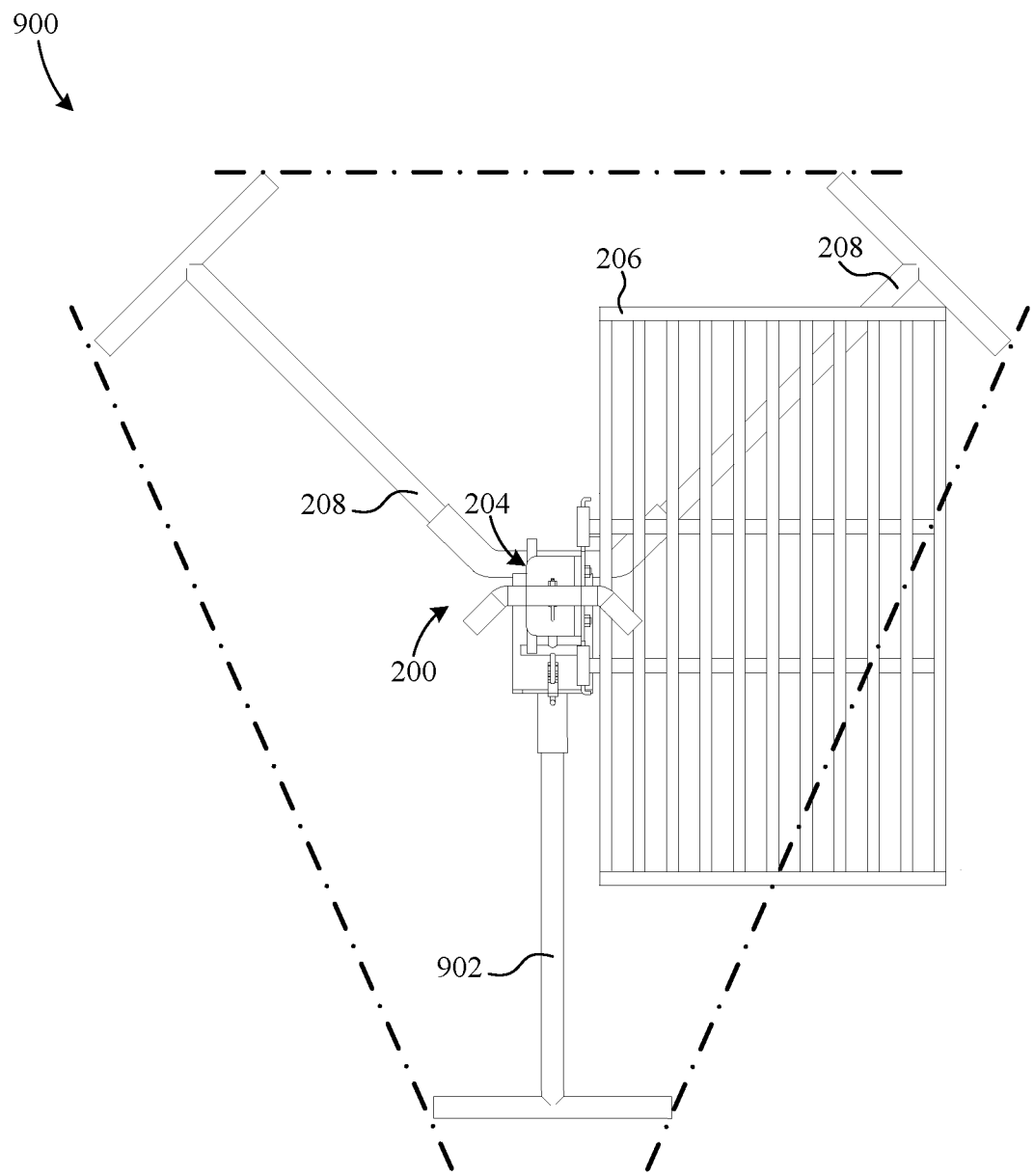
FIG. 9 shows a top view of an alternate example grill.
Figure 10:
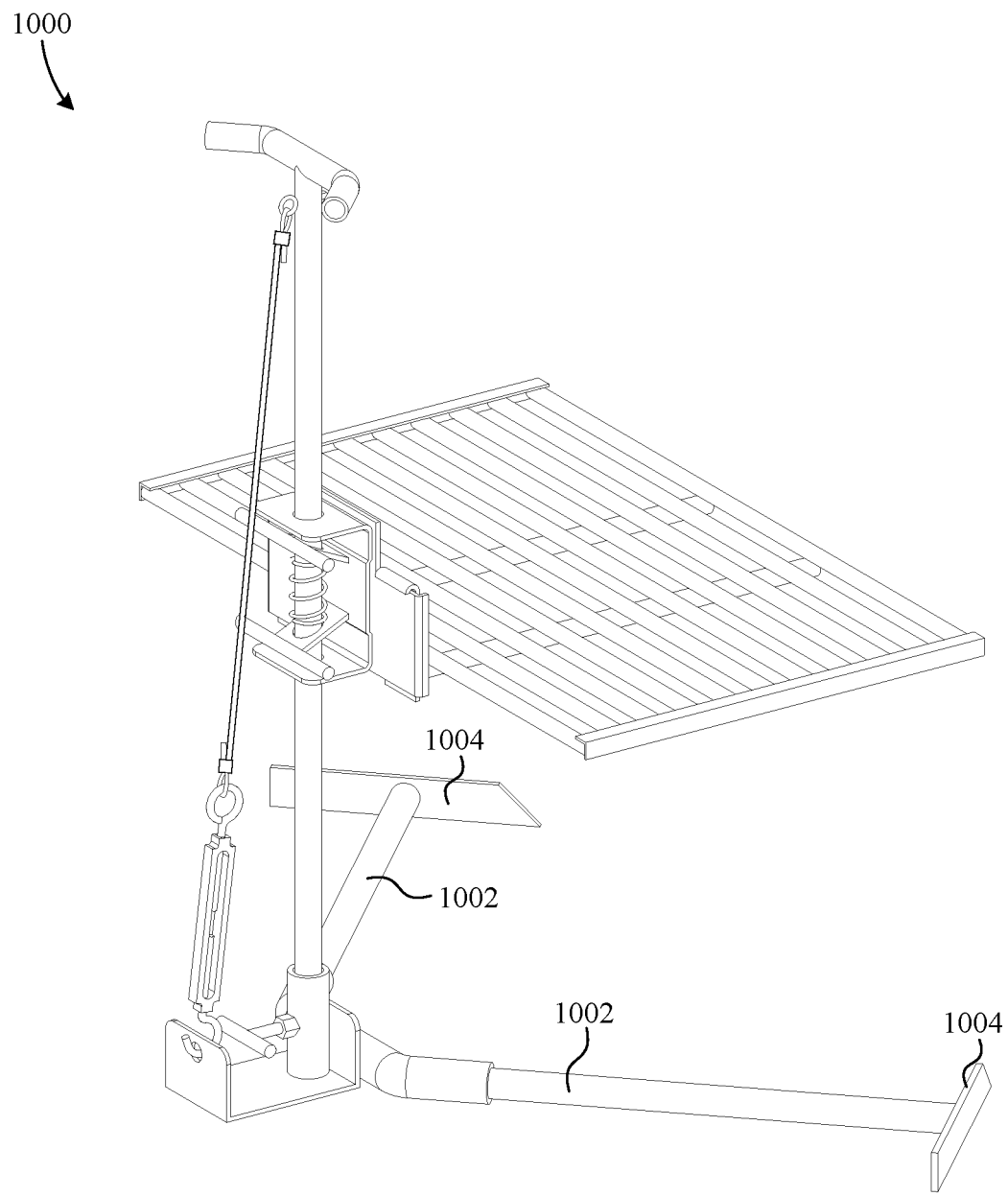
FIG. 10 shows a rear perspective view of another alternate example grill.

FIG. 9 shows a top view of an alternate example grill 900. In this particular example, grill 900 is substantially similar to grill 100, except that grill 900 further includes a vertical support column with circular cross-section (not visible) and a third stabilizer 902. Other elements of grill 900 that are substantially identical to those of grill 100 will be denoted by like reference numbers and not described again here, to avoid redundancy. The circular cross-section of the column of grill 900 allows height adjustment assembly 204 and, therefore, grate 206 to be rotated about the column. This allows grate 206 to be rotated from a position over the underlying fire to a position that is not over the fire, without having to move base assembly 200. Stabilizers 902 prevents grill 900 from tipping when height adjustment assembly 204 is rotated about the column. As shown, the center of gravity of grate 206 remains generally behind the dashed lines 900, which prevents grill 900 from tipping. In this example, assembly 204 is shown rotated 90 degrees from the forward position but may rotate 360 degrees if desired. FIG. 10 shows a rear perspective view of another example grill 1000. In this particular example, grill 1000 is substantially similar to grill 100, except that stabilizers 1002 of grill 1000 include alternate feet 1004. Other elements of grill 1000 that are substantially identical to those of grill 100 will be denoted by like reference numbers and not described in detail again to avoid redundancy. Feet 1004 provide generally the same function as feet 212 when in the horizontal position as shown, but also provide additional functionality when rotated 90 degrees as shown in FIG. 11.

Figure 11:
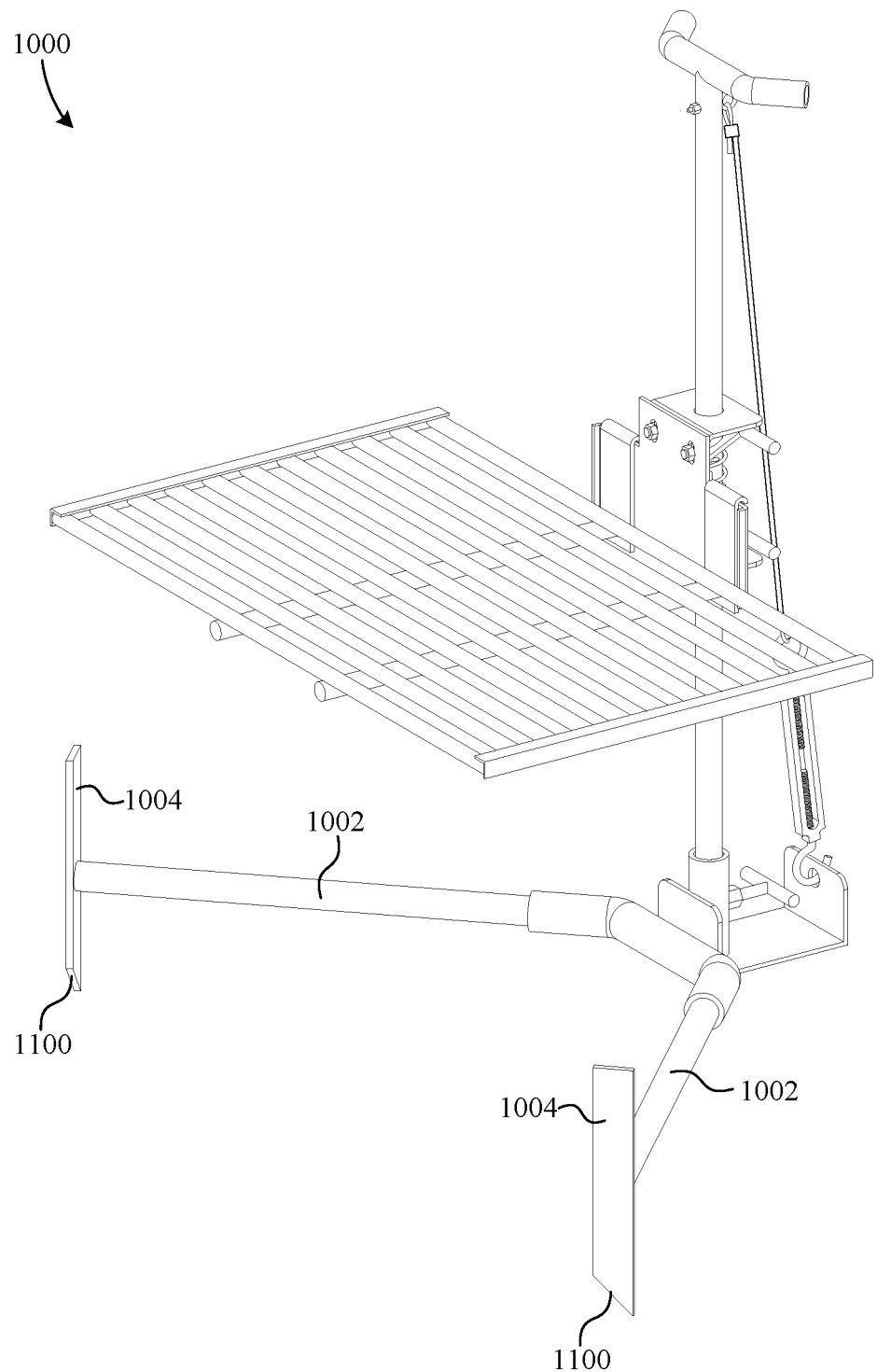
FIG. 11 shows a front perspective view of the grill of FIG. 10.

FIG. 11 shows a front perspective view of grill 1000 wherein feet 1004 are rotated 90 degrees to point downward, where they can function as stakes. That is, feet 1004 have pointed ends 1100 which allow them to be pounded into the underlying ground. The "stakes" provide addition stability to grill 1000.

Figure 12:
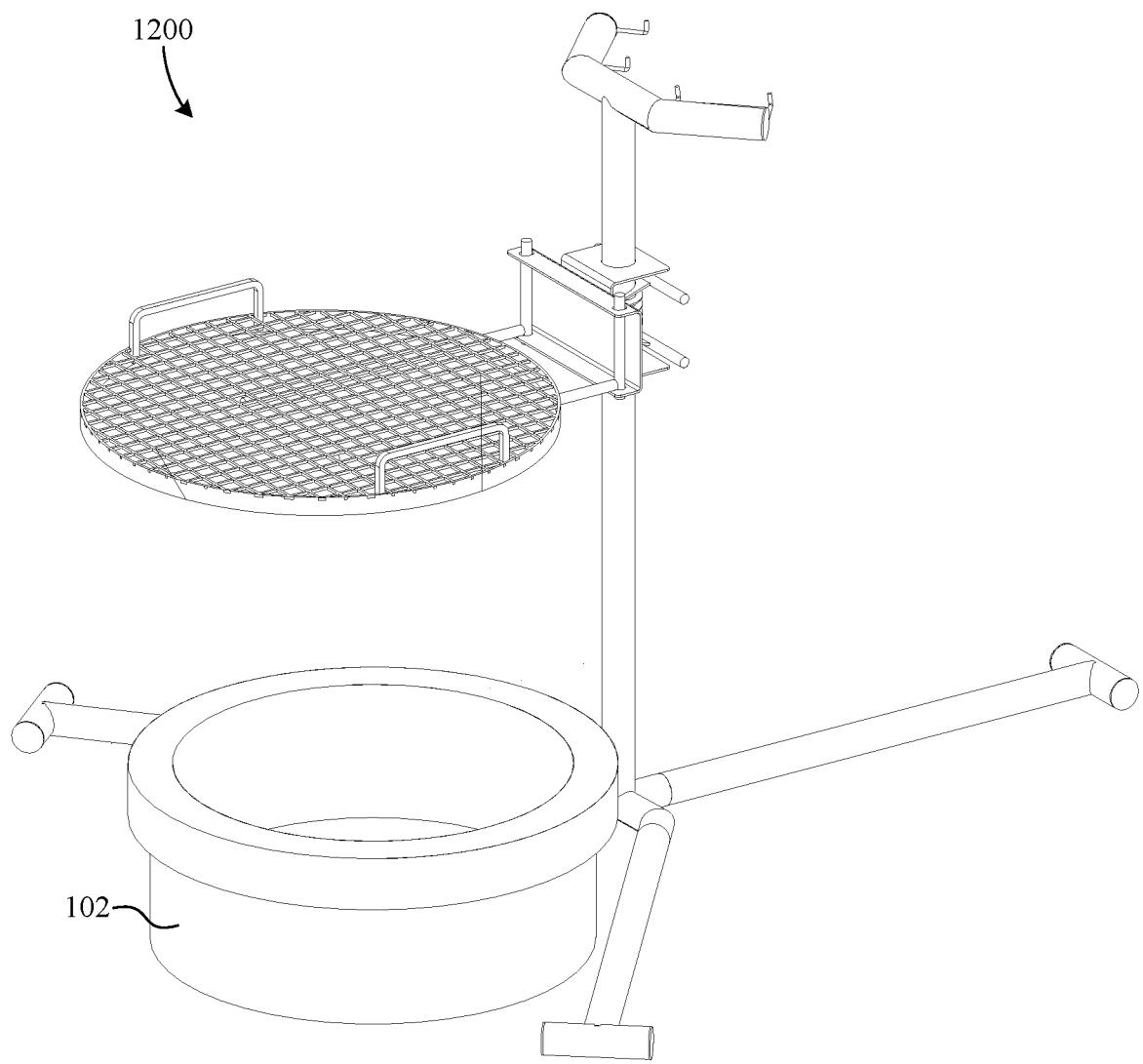
FIG. 12 shows a perspective view of yet another alternate example grill.

FIG. 12 shows a perspective view of an alternate portable campfire grill 1200 positioned over, and partially around, fire ring 102. Grill 1200 facilitates the cooking, heating, and/or smoking of food and/or other things (e.g. pot of water) over a campfire contained within ring 102. Grill 1200 is vertically and horizontally adjustable such that the cooking temperature of the food can be controlled. Furthermore, grill 1200 is configured to be disassembled and reassembled for portability.

Figure 13:
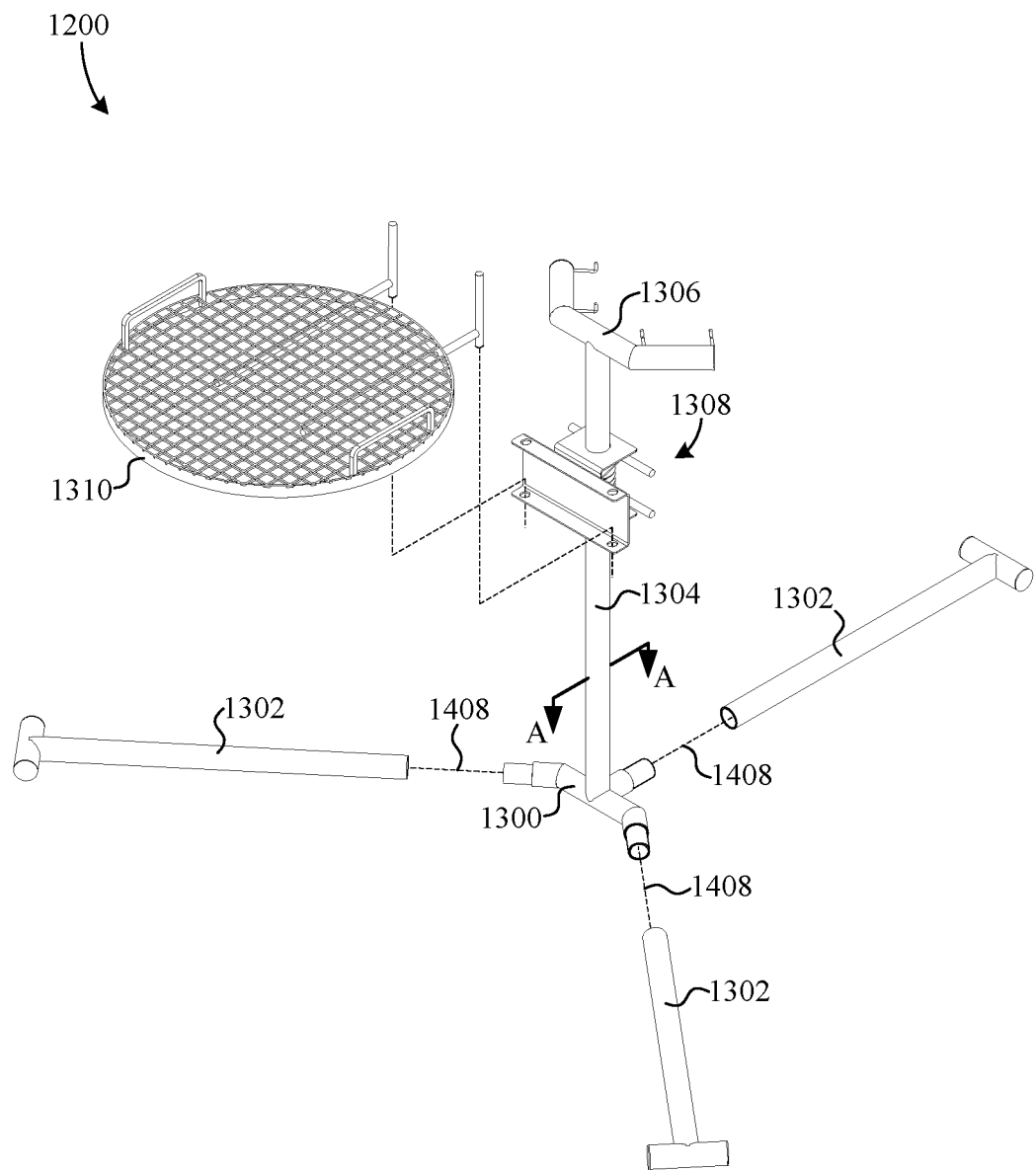
FIG. 13 shows a perspective view of the grill of FIG. 12 partially exploded.

FIG. 13 shows a perspective view of grill 1200 disassembled. Grill 1200 includes a base frame 1300, a set of transverse stabilizers 1302, a support column 1304, a handle 1306, a height adjustment assembly 1308, and a cooking platform 1310. Transverse stabilizers 1302 are configured to be detachably coupled to base frame 1300 and are configured to support grill 1200 on a surface such as the underlying ground. Column 1304 is a substantially vertically positioned tube along which height adjustment assembly 1308 is adjustably supported. The bottom portion and opposite top portion of support column 1304 are fixed to base frame 1300 and handle 1306, respectively. Height adjustment assembly 1308 is adjustably coupled to support column 1304 to facilitate vertical adjustment of cooking platform 1310 and also the rotation of cooking platform 1310 about support column 1304. Cooking platform 1310 is configured to be detachably coupled to height adjustment assembly 1308. In this particular example, cooking platform 1310 is a grill grate but may also include and other type of food support device including, but not limited to, a griddle, hook(s), skewers, and so on.

Figure 14:
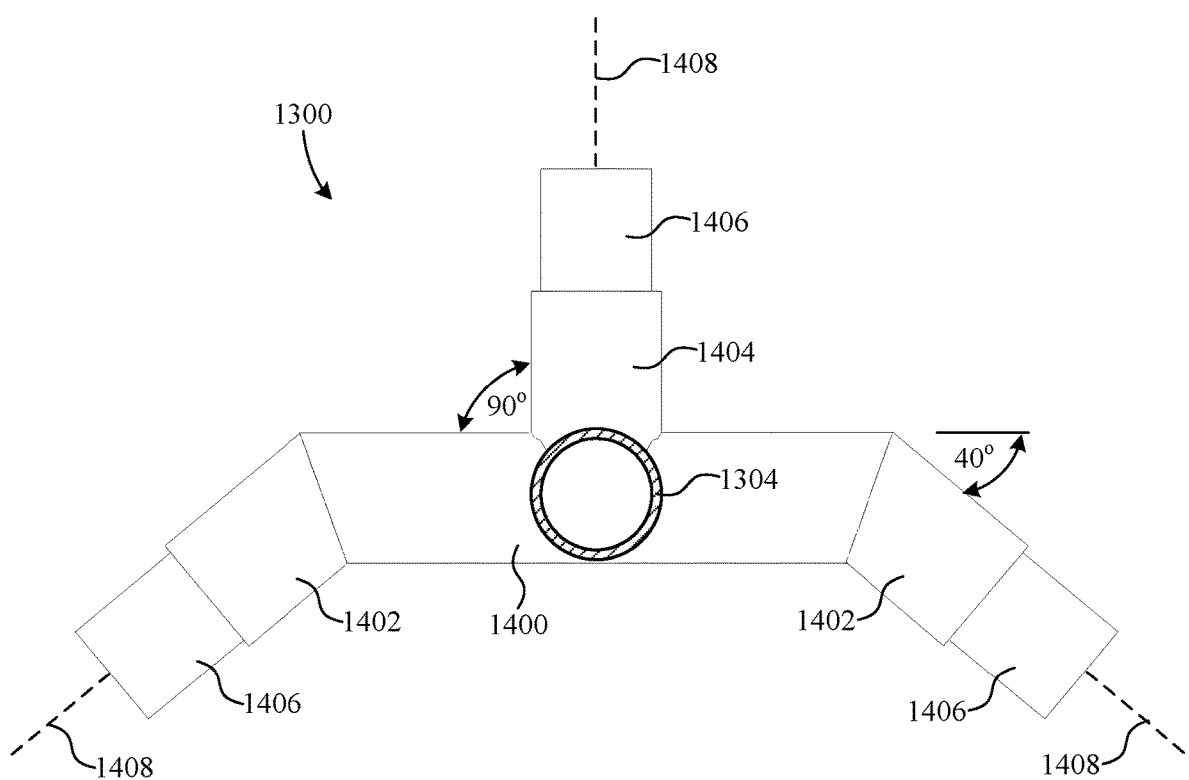
FIG. 14 shows a top view of a frame base of the grill of FIG. 12.

FIG. 14 shows a top plan view of base frame 1300 with support column 1304 sectioned along line A-A of FIG. 13. Base frame 1300 provides structural support and integrity between stabilizers 1302 and support column 1304. In the example embodiment, base frame 1300 is formed entirely from sections of stainless steel tube.

Base frame 1300 includes an intermediate section 1400, two side sections 1402, a middle section 1404, and three couplers 1406. Each of side sections 1402 is welded to a respective side end of intermediate section 1400 at a forty degree angle. Middle section 1404 is welded to the middle of intermediate section 1400 at a ninety degree angle. Each of couplers 1406 is a short section of tube having an outside diameter slightly smaller than the inner diameter of sections 1402 and 1404. Each of couplers 1406 is permanently fixed in place by, for example, friction fit and/or welding (e.g. friction welding). Couplers 1406 facilitate the removable attachment of stabilizers 1302 (FIG. 13) to base frame 1300. More specifically, the outside diameter of couplers 1406 is also slightly smaller than the inner diameter of stabilizers 1302 such that stabilizers 1302 can be removably friction fit around couplers 1406. Of course, the friction between the interior surface of stabilizers 1304 and the exterior surface of couplers 1406 is high enough to hold them together when assembled but low enough to allow a user to pull them apart during disassembly. In the example embodiment, couplers 1406 extend along substantially coplanar axes 1408. However, base frame 1300 may be configured such that axes 1408 extend at least partially downward to form a tripod.

Figure 15:
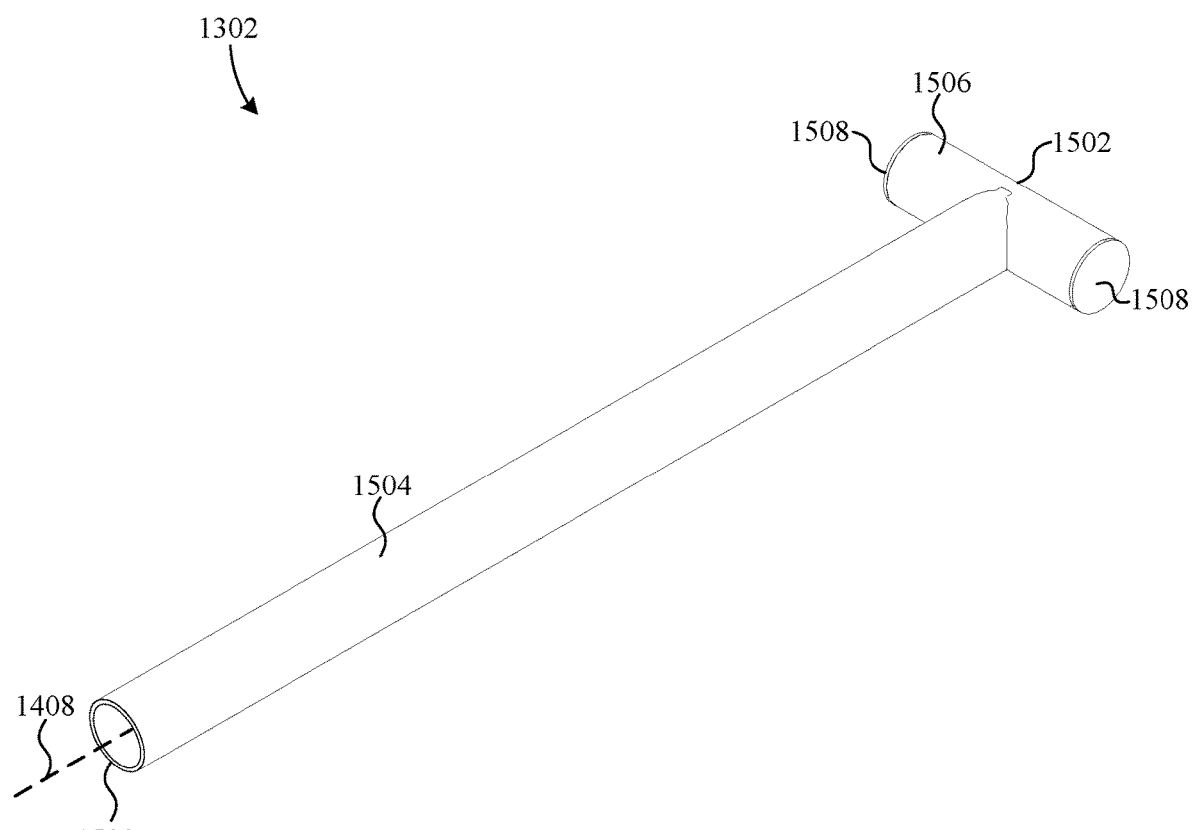
FIG. 15 shows a perspective view of one of the stabilizers of the grill of FIG. 12.

FIG. 15 shows a perspective view of one of transverse stabilizers 1302, which includes a proximal end 1500 and an opposite distal end 1502. Stabilizer 1302 is formed from a first section 1504 of stainless steel tube welded to a perpendicular second section 1506 of stainless steel tube. Proximal end 1500 is configured to receive a respective one of couplers 1406 when stabilizer 1302 is attached to base frame 1300. The friction between the interior surface of stabilizers 1304 and the exterior surface of couplers 1406 is high enough to hold them together in a fixed position when assembled but low enough to allow stabilizer 1302 to be rotated about axis 1408. Rotating stabilizer 1302 about axis 1408 causes the orientation of section 1506, which facilitates leveling of grill 1200 on an uneven underlying surface. The leveling of grill 1200 by rotating stabilizers 1302 will be described with reference to upcoming FIG. 19. Stabilizer 1302 further includes a set of two end caps 1508 disposed in respective opposite ends of section 1506.

Figure 16:
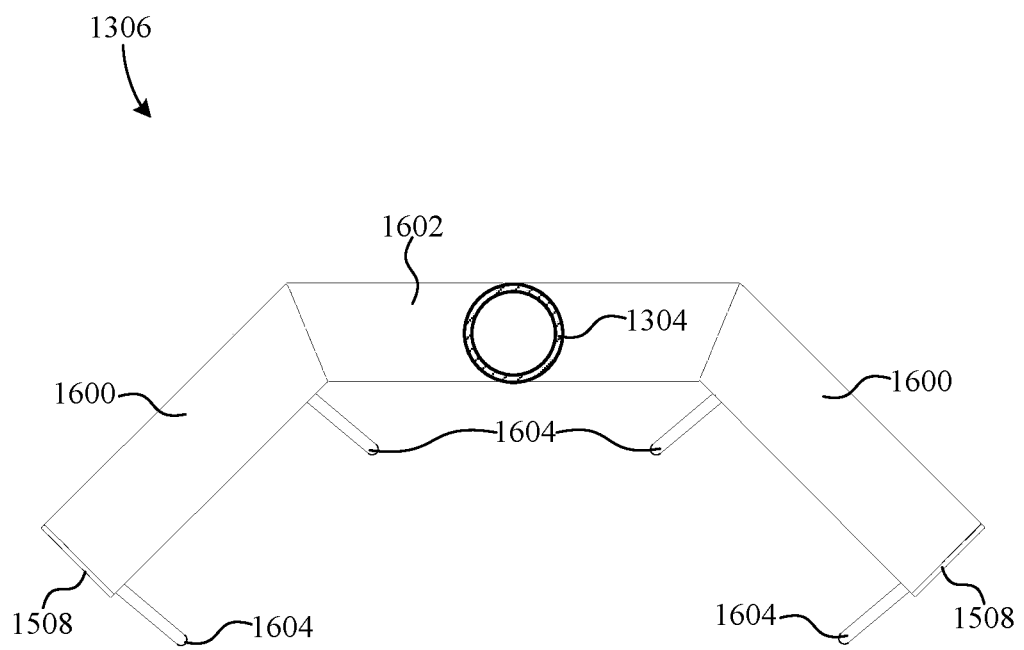
FIG. 16 shows a bottom plan view of a handle of the grill of FIG. 12.

FIG. 16 shows a bottom perspective view of handle 1306 with support column 1304 sectioned along line A-A of FIG. 13. Handle 1306 provides a structure to grasp with both hands when moving grill 1200. Specifically, handle 1306 is configured like a handlebar in that it includes two handle sections 1600 fixed to respective opposite ends of an intermediate section 1602. Sections 1600 and 1602 are formed from stainless steel tube welded together. Handle 1306 further includes a plurality of hangers 1604 welded thereto. Hangers 1604 provide structures to hang various cooking utensils from handle 1306. Handle 1306 further includes a set of two end caps 1508 disposed in the otherwise open ends of respective sections 1600.

Figure 17:
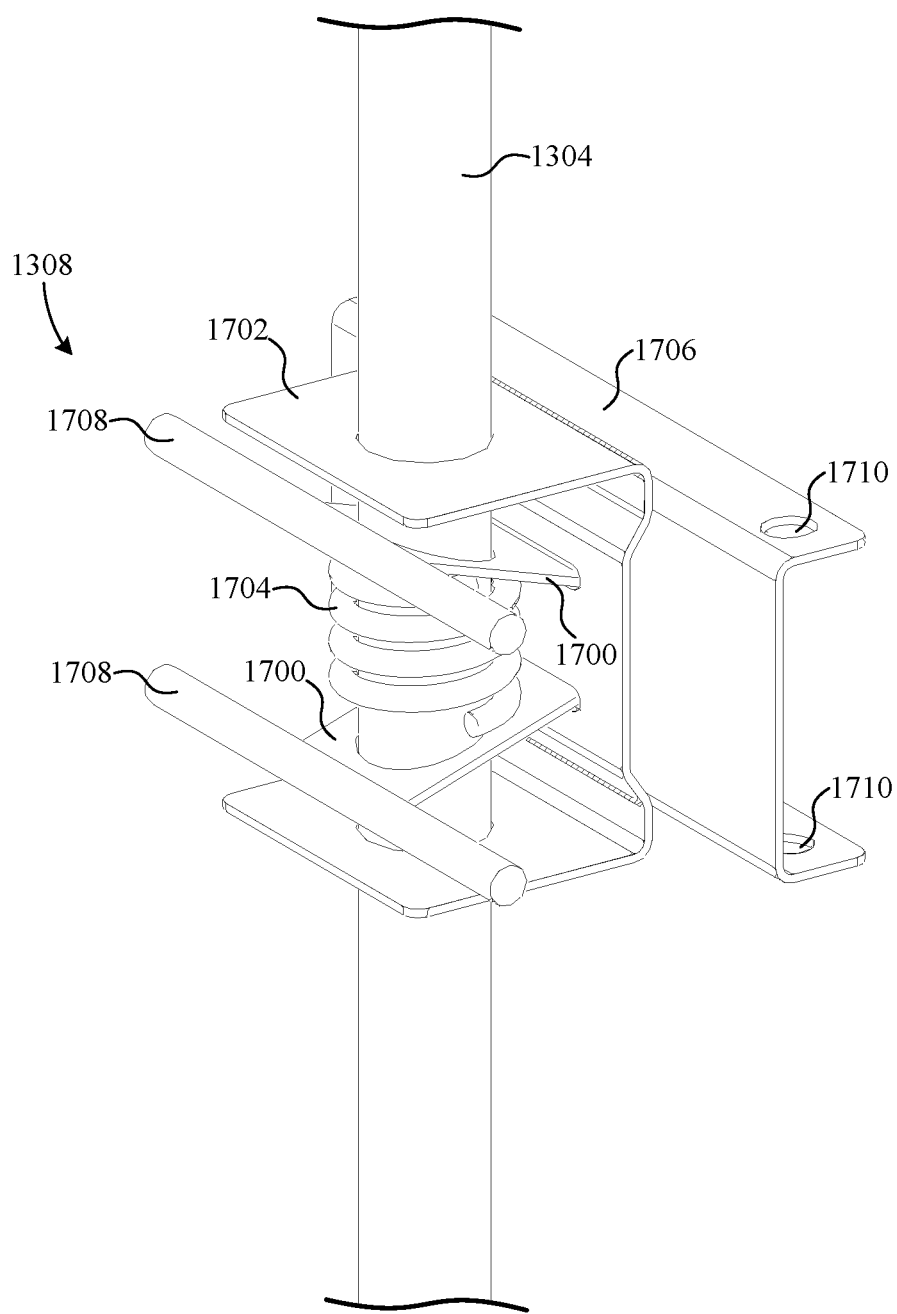
FIG. 17 shows a rear perspective view of a height adjustment assembly of the grill of FIG. 12.

FIG. 17 shows a rear perspective view of height adjustment assembly 1308 coupled to support column 1304. Assembly 1308 includes two hinge plates 1700, a frame 1702, a biasing member (spring 1704), and a carrier 1706. Hinge plates 1700 are hingably coupled to frame 1702 and urged away from one another via spring 1704, which is disposed therebetween. Each of hinge plates 1700 includes a handle 1708 which, when urged together, cause hinge plates 1700 to compress spring 1704 and to disengage support column 1304. Once hinge plates 1700 disengage support column 1304, height adjustment assembly 1308 is free to slide up and down support column 1304. Of course, when the user lets go of handles 1708, spring 1704 urges hinge plates 1700 away from one another and they bite into support column 1304, thereby locking height adjustment assembly 1308 at a fixed vertical height. Carrier 1706 is fixed to frame 1702 and includes four apertures 1710 configured to selectively receive cooking platform 1310. Thus, height adjustment assembly 1308 provides a means for adjusting a position of cooking platform 1310 along support column 1304. Hinge plates 1700 and spring 1704 provide a means for locking cooking platform 1310 in an adjusted position along support column 1304.

Figure 18:
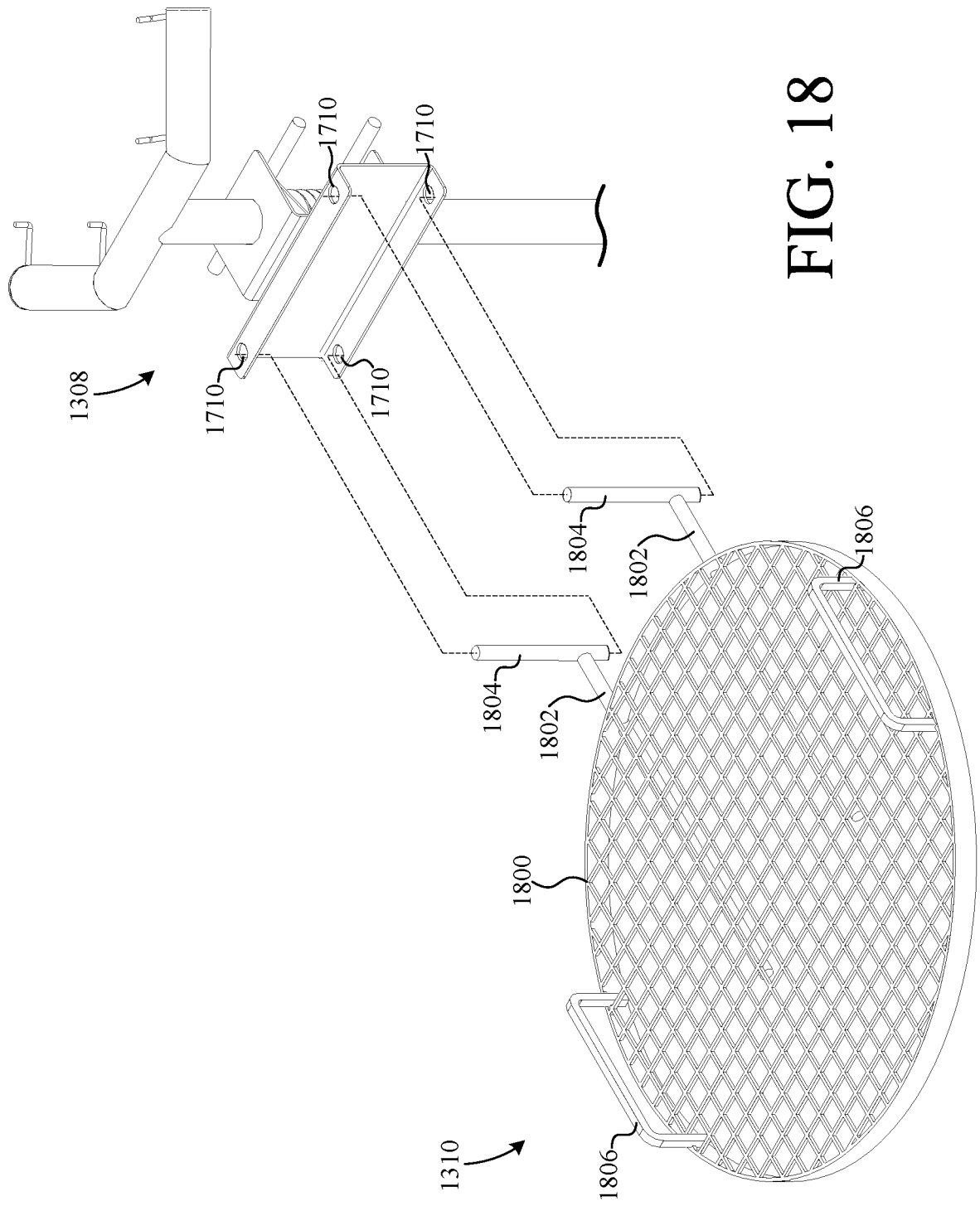
FIG. 18 shows a perspective view of a cooking platform and the height adjustment assembly of the grill of FIG. 12.

FIG. 18 shows a front perspective view of cooking platform 1310 removed from height adjustment assembly 1308. Cooking platform 1310 includes a grate 1800, a set of transverse support rods 1802, a set of upright support rods 1804, and a set of handles 1806. Grate 1800 is configured to support food and/or other objects (i.e., pots, pans, etc.). Transverse rods 1802 are attached to the bottom of grate 1800 to provide beam support thereto. Upright support rods 1804 are welded to the ends of respective transverse support rods 1802 to facilitate the selective attachment of cooking platform 1310 to carrier 1706. Handles 1806 are attached to grate 1800 to allow the user to lift cooking platform 1310 evenly with both hands. In this example grill, grate 1800, transverse support rods 1802, upright support rods 1804, and handles 1806 are all formed from stainless steel.

The selective coupling and decoupling of cooking platform 1310 to and from, respectively, height adjustment assembly 1308 is described as follows. First, the user grasps handles 1806 and inserts the top ends of upright rods 1804 through the bottoms of the top two apertures 1710. Then, the user continues lifting cooking platform until the bottom of upright rods 1804 are coaxially aligned with the bottom two apertures 1710. Next, the user lowers cooking platform 1310 until the bottom of upright rods 1804 are seated in the respective bottom two apertures 1710. Then the user lets go of handles 1806, thereby causing carrier 1706 to support cooking platform 1310. The removal of cooking platform 1310 from carrier 1706 is accomplished by reversing the aforementioned process.

Figure 19:
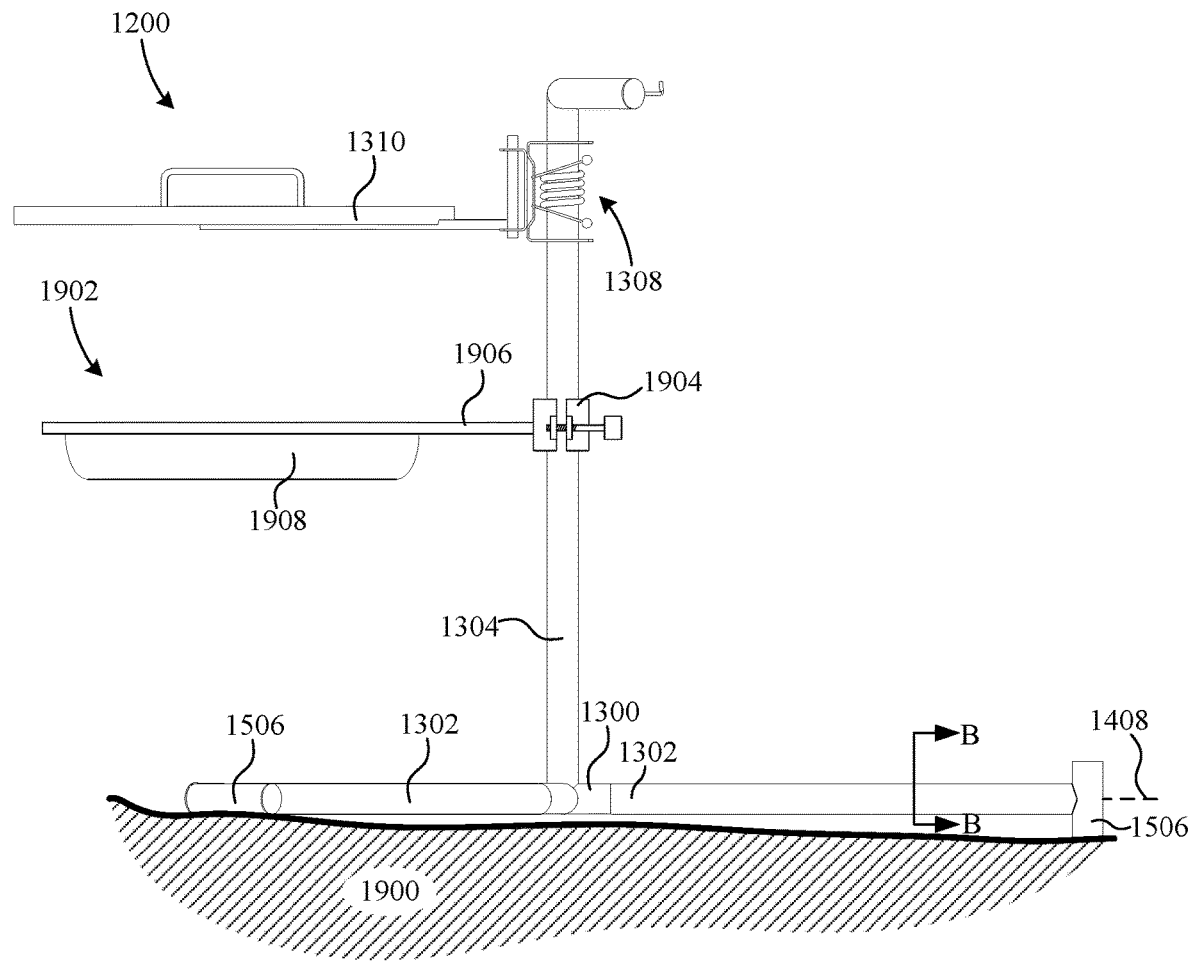
FIG. 19 shows a side plan view of the grill of FIG. 12.

FIG. 19 shows a side view of grill 1200 in a raised position and resting on an unlevel ground 1900. To compensate for the unlevel ground 1900, one of stabilizers 1302 is rotated ninety degrees such that one distal end of section 1506 abuts ground 1900. Although section 1506 is disposed in a substantially vertical orientation, it can be disposed in any orientation 360 degrees about axis 1408, depending on how level the underlying surface is. Of course, any of the three stabilizers 1302 can be rotated appropriately depending on the contour of the underlying surface. For example, section 1506 of the front one of stabilizers 1302 is oriented horizontally. Optionally, couplers 1406 and proximal ends 1500 may include complementary locking features to prevent undesired rotation and/or displacement of stabilizers 1302 with respect to frame base 1300. Such locking features may include, but are not limited to, push springs and complementary apertures. As another option adjustable leveling legs can be coupled to the distal ends of stabilizers 1302.

Optionally, grill 1200 may further include a bowl assembly 1902 removably and adjustably mounted to support column 1304. Bowl assembly 1902 includes a clamp assembly 1904, a frame structure 1906, and a bowl 1908. Clamp assembly 1904 is configured to selectively mount to support column 1304 at any desired elevation. Frame structure 1906 provides structural support between bowl 1908 and clamp assembly 1904. Bowl 1908 is configured to hold various objects including, but not limited to, charcoal, wood, damp wood chips for smoking, water, etc. Accordingly, grill 1200 may be used without an underlying ground campfire. For example, grill 1200 may be used to grill food on a deck by simply confining the burning to within bowl 1908.

Figure 20A:
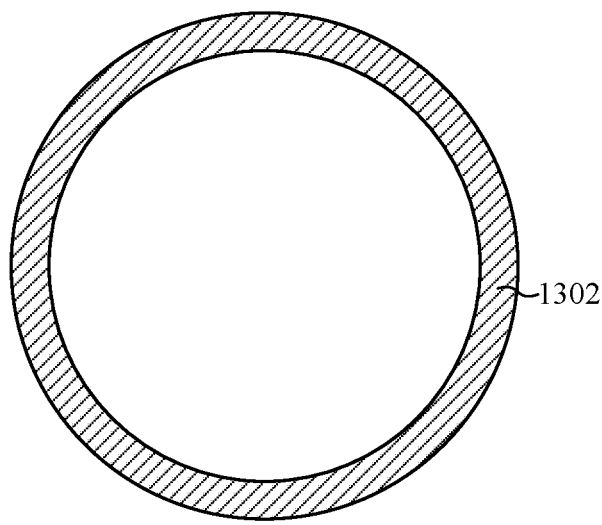
FIG. 20A shows a cross-sectional view of one of the stabilizers of FIG. 12.

FIG. 20A shows a cross-sectional plan view of stabilizer 1302 taken along line B-B of FIG. 19. As shown, stabilizer 1302 is formed from a round tube. Therefore, stabilizer 1302 can be disposed at an angle about axis 1408.

Figure 20B:
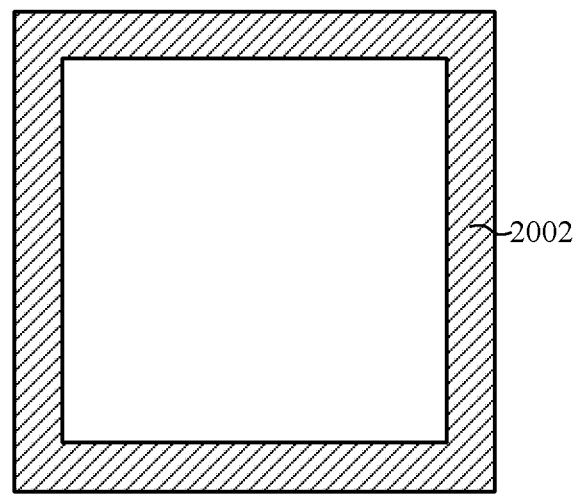
FIG. 20B shows a cross-sectional view of an alternate stabilizer.

FIG. 20B shows a cross-sectional plan view of an alternate stabilizer 2002. In this example, stabilizer 2002 is substantially similar to stabilizer 1302 but has a square cross-sectional profile rather than a round profile. In this configuration, stabilizer 2002 is rotatable about axis 1408 in 90 degree increments. Of course, frame base 1300 would be slightly modified to mate with stabilizer 2002 such as, for example, by also being fabricated from square tube.

Figure 21A:
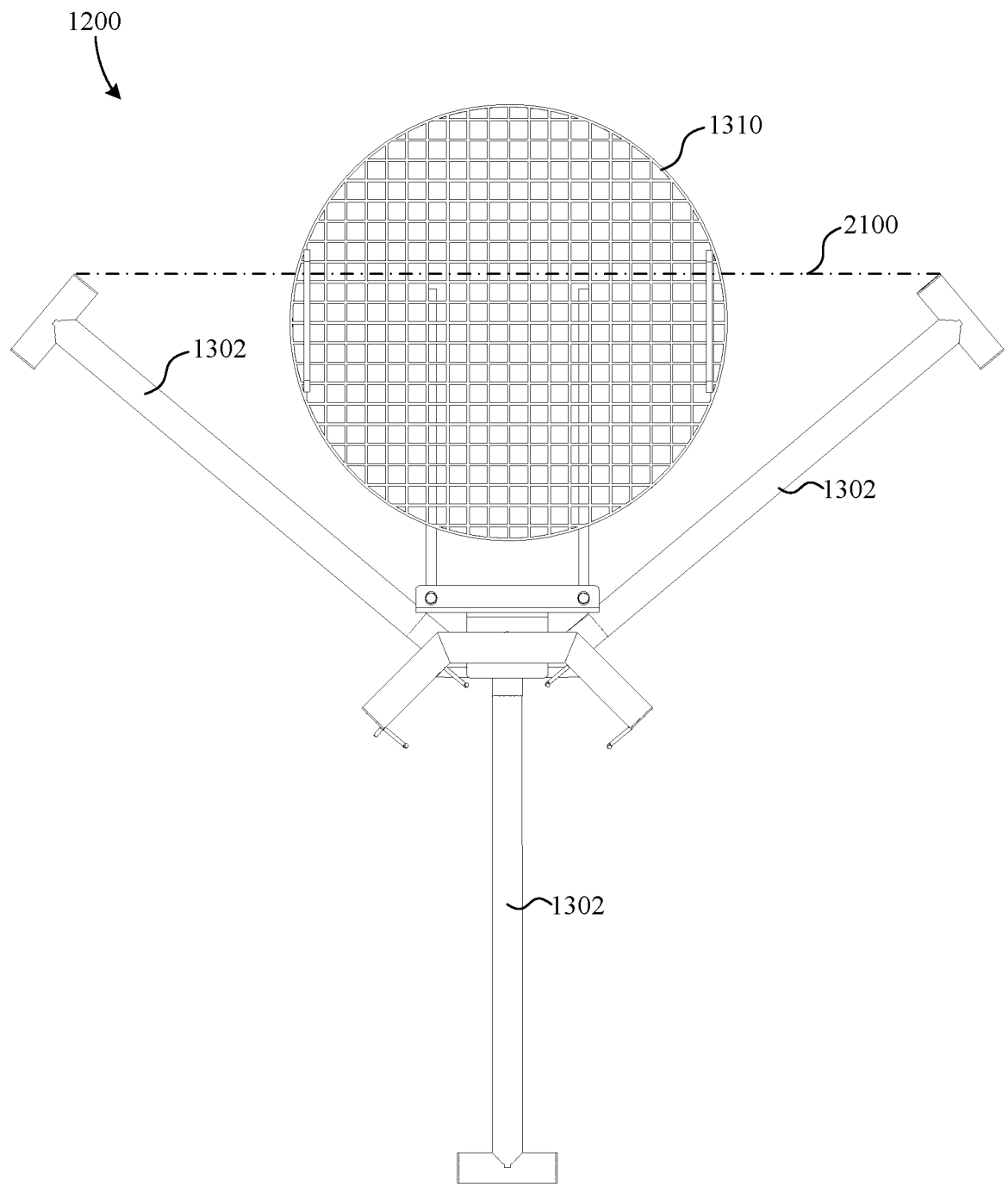
FIG. 21A shows a top plan view of the grill of FIG. 12 with the cooking platform in a forward facing position.

FIG. 21A shows a top view of grill 1200 wherein cooking platform 1310 is in a forward facing position (e.g., over a fire ring 102 (FIG. 12)). As shown, the center of cooking platform 1310 is behind line 2100, which extends between the two forward most points of the front stabilizers 1302. This prevents grill 1200 from tipping forward when weight is loaded onto cooking platform. Optionally, all of stabilizers 1302 may have longer versions of sections 1504 so that grill 1200 cannot tip, regardless of where cooking platform 1310 is positioned about support column 1304. As another option, each of stabilizers 1302 may include one or more extender tubes disposed between proximal end 1500 and coupler 1406.

Figure 21B:
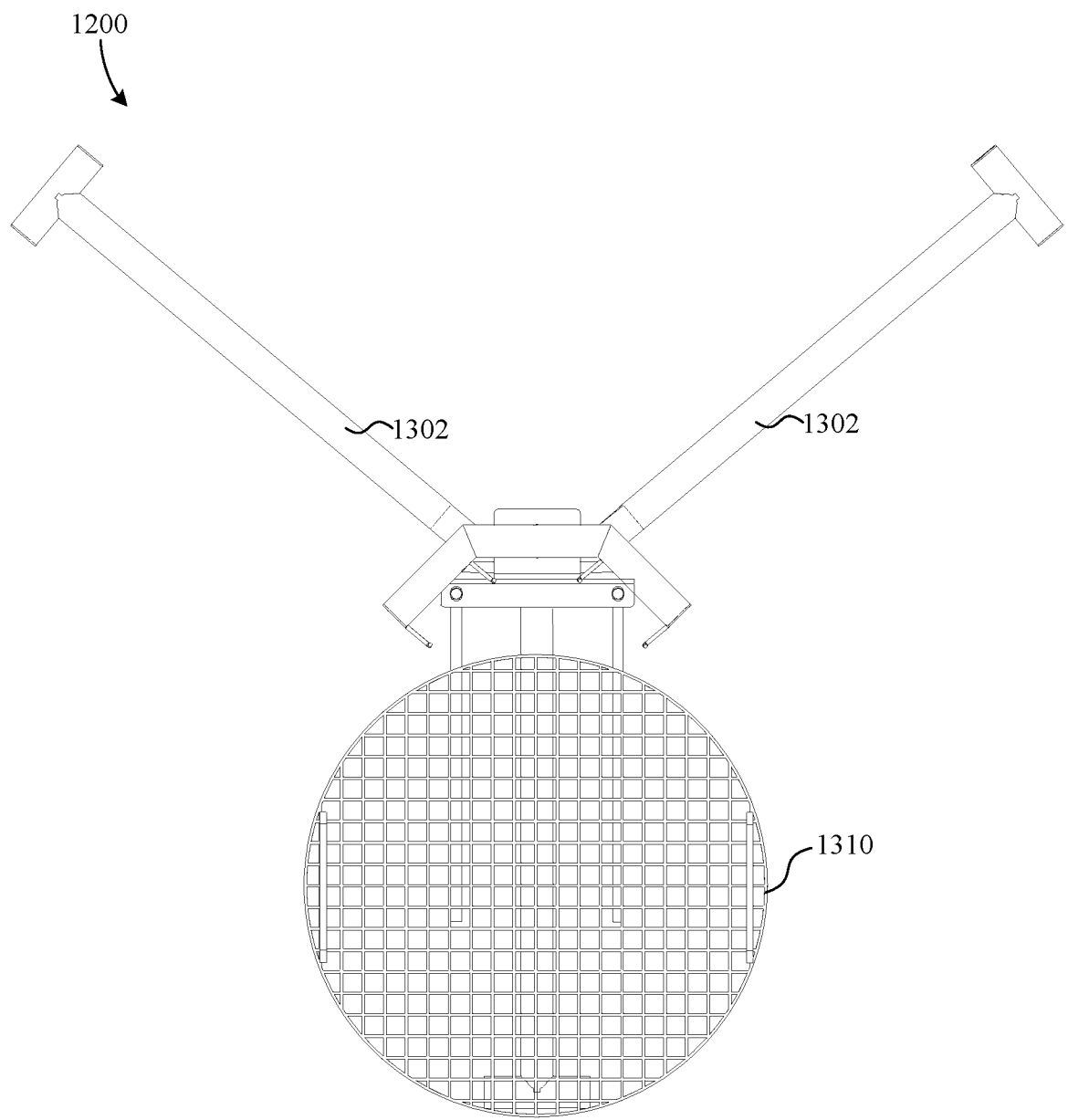
FIG. 21B shows a top plan view of the grill of FIG. 12 with the cooking platform in a rear facing position.

FIG. 21B shows a top view of grill 1200, wherein cooking platform 1310 is rotated 180 degrees about support column 1304 (e.g., not over a fire ring 102). Height adjustment assembly 1308 and, therefore, cooking platform 1310 can be positioned at any desirable angle about support column 1304. Rotating height adjustment assembly 1308 about support column 1304 can be done without urging handles 1708 together. Further, when height adjustment assembly 1308 is rotated, height adjustment assembly 1308 remains at a relatively fixed height as long as handles 1708 are not urged toward one another.

Figure 22:
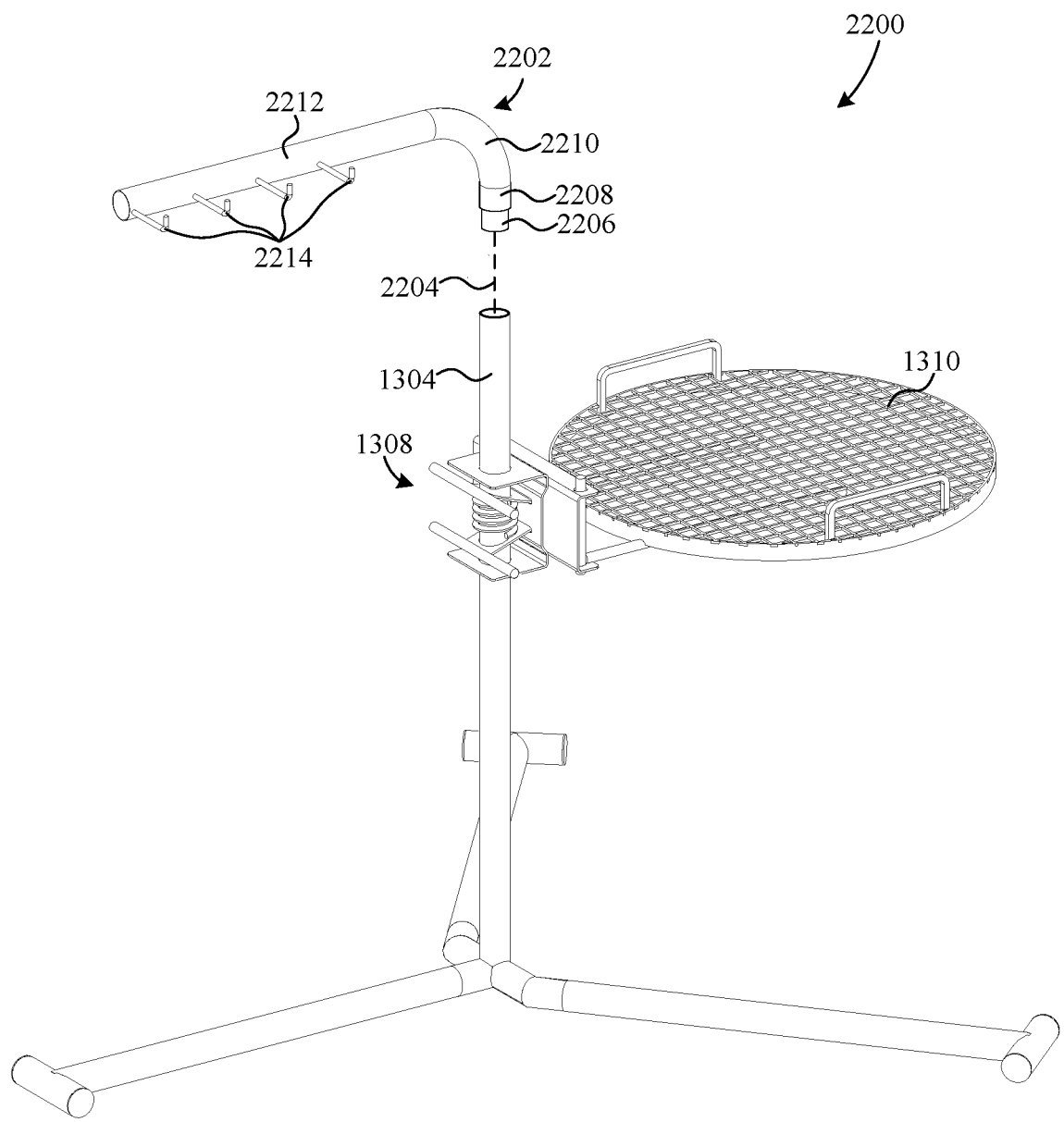
FIG. 22 shows a rear perspective view of another alternate grill.

FIG. 22 shows a perspective view of another alternate portable grill 2200. Grill 2200 is substantially similar to grill 1200, except that handle 2202 is substituted for handle 1306 of grill 1200. Therefore, like components are denoted by like reference numbers and not described again in detail to avoid redundancy.

Handle 2202 is removably coupled to the top of support column 1304. Handle 2202 is free to rotate about an axis 2204 when coupled to support column 1304. This allows the user to rotate handle 2202 away from the fire to prevent handle 2202, and accessories hanging therefrom, from getting too hot. Handle 2202 can also function as a boom arm for hanging objects such as, for example, kettles over the underlying fire. Handle 2202 includes a coupler 2206, a short straight section of tube 2208, a tubular elbow 2210, a long straight section of tube 2212, and a plurality of hangers 2214. Coupler 2206 is fixed to the interior walls of tube 2208 and is configured to rotate 360 degrees inside of support column 1304. Tube 2208 is fixed to a first end of elbow 2210 and tube 2212 is fixed to the opposite section end of elbow 2210. Hangers 2214 are fixed to extend perpendicularly from tube 2212. In this example, handle 2202 is fabricated entirely from stainless steel.

Figure 23:
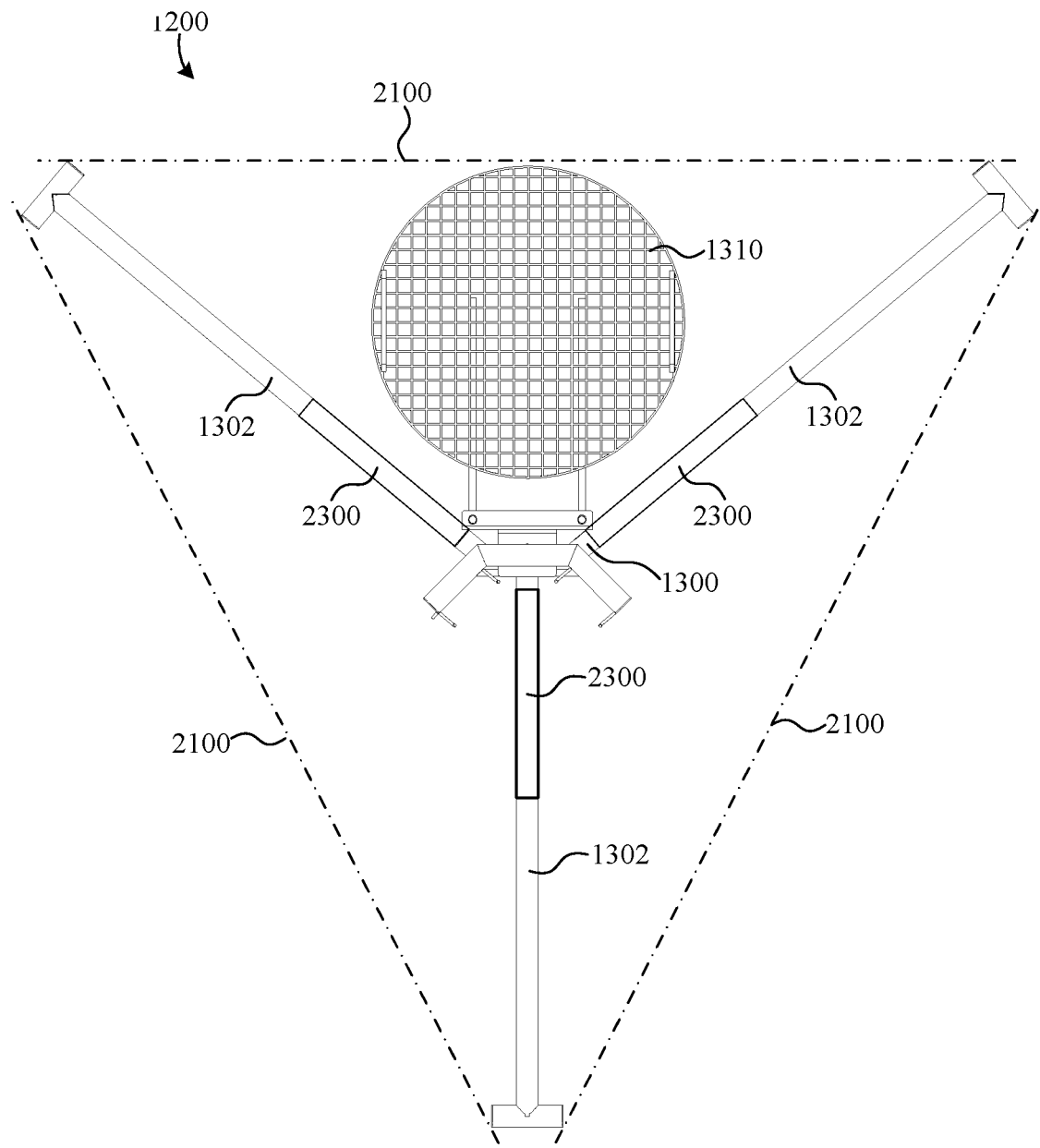
FIG. 23 shows a top plan view of the grill of FIG. 12 further including a plurality of extender tubes according to a first configuration.

FIG. 23 shows a top view of grill 1200 further including three extender tubes 2300 according to a first configuration. Each of extender tubes 2300 is disposed between frame base 1300 and a respective one of stabilizers 1302 via a respective coupler 1406. As shown, the entire cooking platform 1310 is behind line 2100, which extends between the two forward most points of the front stabilizers 1302. This prevents grill 1200 from tipping forward when weight is loaded anywhere on cooking platform 1310, regardless of the position of cooking platform 1310 about support column 1304.

Figure 24:
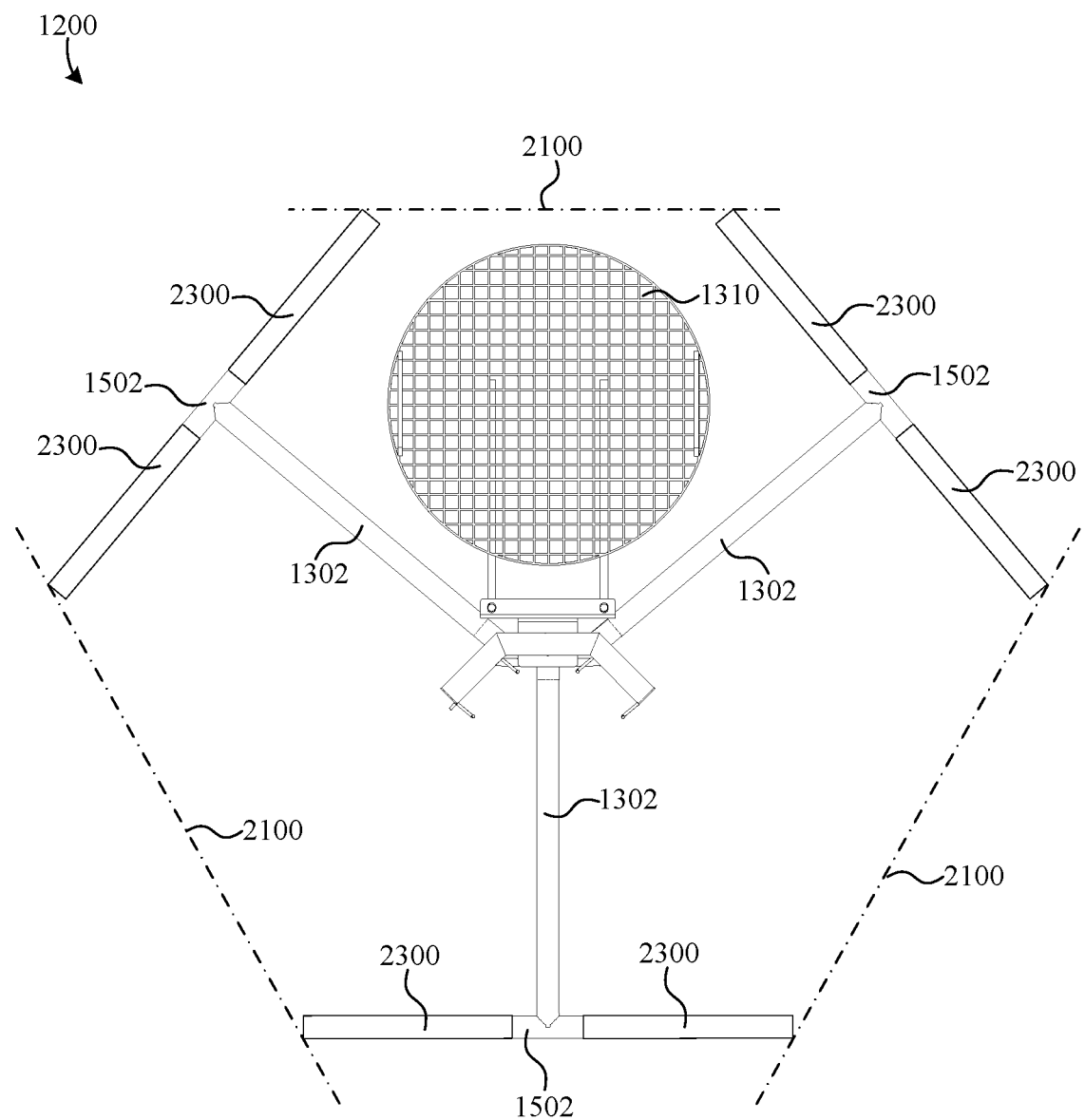
FIG. 24 shows a top plan view of the grill of FIG. 12 further including a plurality of extender tubes according to a second configuration.

FIG. 24 shows a top view of grill 1200 further including six extender tubes 2300 according to a second configuration. Each of extender tubes 2300 is coupled to a respective one of the six open ends of sections 1502 of stabilizers 1302 via a respective coupler 1406. As shown, the entire cooking platform 1310 is behind line 2100, which extends between the two forward most points of the open ends of extender tubes 2300. This prevents grill 1200 from tipping forward when weight is loaded anywhere on cooking platform 1310, regardless of the position of cooking platform 1310 about support column 1304. Although not shown, stabilizers 1302 are fixed to frame base 1300 by, for example, a pin (e.g., press pin, spring pin, cotter pin, detent, etc.) to prevent stabilizers 1302 from rotating about couplers 1406.

Figure 25:
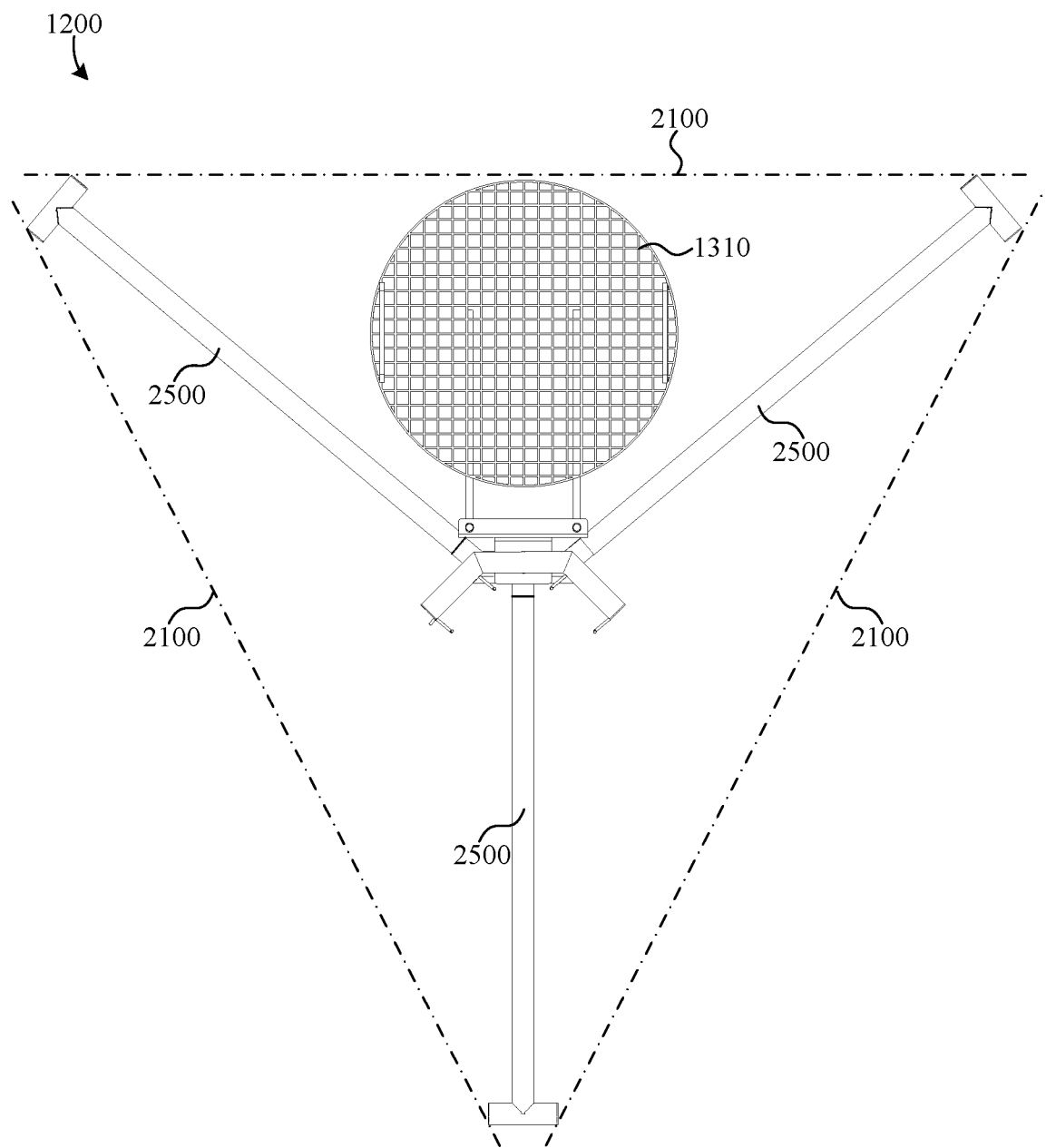
FIG. 25 shows a top plan view of the grill of FIG. 12 having alternate stabilizers.

FIG. 25 shows a top view of grill 1200 with alternate stabilizers 2500 substituted for stabilizers 1302. As shown, stabilizers 2500 are substantially similar to stabilizers 1302 except that stabilizers 2500 are longer. This additional length results in the entire cooking platform 1310 remaining behind line 2100, which extends between the two forward most points of the front stabilizers 2500. This prevents grill 1200 from tipping forward when weight is loaded anywhere on cooking platform 1310, regardless of the position of cooking platform 1310 about support column 1304.

The description of particular embodiments of the present invention is now complete. Many of the described features may be substituted, altered or omitted without departing from the scope of the invention. For example, any feature of any particular embodiment can be combined with or added to any other embodiment, to provide the other embodiment with the benefit/advantages of the particular feature. As another example, alternate materials (e.g., aluminum, galvanized steel), may be substituted for the stainless steel used in the disclosed embodiments. As yet another example, the portable grill may include more than three stabilizers. These and other deviations from the particular embodiments shown will be apparent to those skilled in the art, particularly in view of the foregoing disclosure.

I claim:

1. A portable grill comprising:
    a base frame configured to rest on a supporting surface;
    a first transverse stabilizer coupled to said base frame and extending transversely from said base frame along a first axis, said first transverse stabilizer having a proximal end and a distal end, said proximal end being coupled to said base frame, said distal end including a first elongated foot extending along a second axis that intersects said first axis;
    a second transverse stabilizer coupled to said base frame and extending transversely from said base frame along a third axis that intersects said first axis at said base frame, said second transverse stabilizer having a proximal end and a distal end, said proximal end being coupled to said base frame, said distal end including a second elongated foot extending along a fourth axis that intersects said third axis, said first transverse stabilizer and said second transverse stabilizer being oriented to rest upon said supporting surface;
    a support column coupled to said base frame and extending from said base frame in an upward direction;
    a height adjustment assembly coupled to move up and down said support column and configured to be selectively fixed in multiple positions along said support column; and
    a cooking platform coupled to said height adjustment assembly and oriented such that a center of said cooking platform is disposed over a region of said supporting surface disposed between an adjacent pair of said transverse stabilizers.

2. The portable grill of claim 1, wherein said height adjustment assembly is rotatable about said support column.

3. The portable grill of claim 2, wherein said height adjustment assembly is rotatable 360 degrees about said support column.

4. The portable grill of claim 3, wherein:
    said cooking platform includes a center of gravity;
    said first elongated foot has a first end and a second end,
    said second elongated foot has a first end and a second end, said first end of said first foot and said second of said second foot defining a line therebetween; and
    a distance between said line and said support column remains greater than a distance between said center of gravity of said cooking platform and said support column as said height adjustment assembly is rotated about said support column.

5. The portable grill of claim 2, wherein:
    said cooking platform includes a center of gravity;
    said first elongated foot has a first end and a second end,
    said second elongated foot has a first end and a second end, said first end of said first foot and said second of said second foot defining a line therebetween; and
    a distance between said line and said support column remains greater than a distance between said center of gravity of said cooking platform and said support column as said height adjustment assembly is rotated about said support column.

6. The portable grill of claim 1, wherein said transverse stabilizers are detachably coupled to said frame base.

7. The portable grill of claim 6, wherein:
    said frame base includes a plurality of receivers, each of said receivers being configured to receive a respective one of said proximal ends of said transverse stabilizers.

8. The portable grill of claim 7, wherein:
    said portable grill additionally includes a third transverse stabilizer extending along a fifth axis;
    said first axis, said third axis, and said fifth axis lie within a single plane;
    said support column extends along a sixth axis; and
    said sixth axis is perpendicular to said single plane.

9. The portable grill of claim 1, wherein:
    said portable grill additionally includes a third transverse stabilizer; and
    an angle between said first transverse stabilizer and said third transverse stabilizer is the same as an angle between said second transverse stabilizer and said third transverse stabilizer.

10. The portable grill of claim 9, wherein an angle between said second transverse stabilizer and said third transverse stabilizer is the same as said angle between said first transverse stabilizer and said second transverse stabilizer.

11. The portable grill of claim 1, further comprising a handle, and wherein:
    said support column includes a bottom end portion, an opposite top end portion, and an intermediate portion disposed between said bottom end portion and said top end portion;
    said support column extends along an axis oriented in said upward direction;
    said bottom end portion is coupled to said base frame;
    said handle is coupled to said top end portion of said support column;
    said handle includes a plurality of hooks for hanging items thereon;
    said handle is rotatable about said axis oriented in said upward direction;
    said height adjustment assembly is coupled to said intermediate portion of said support column; and
    said cooking platform is disposed above said base frame and below said handle.

12. The portable grill of claim 1, wherein said height adjustment assembly includes a locking mechanism configured to transition between a locked position and an unlocked position, the height of said height adjustment assembly being fixed when said locking mechanism is in said locked position, said height adjustment assembly being free to move up and down said support column when said locking mechanism is in said unlocked position.

13. The portable grill of claim 12, wherein:
    said locking mechanism is configured to transition from said locked position to said unlocked position responsive to an application of force by a user, and said locking mechanism is configured to automatically return to said locked position responsive to cessation of said force by said user.

14. The portable grill of claim 13, wherein:
said locking mechanism includes a first plate, a second plate, and a biasing member;
said first plate defines a first aperture and includes a first edge hingably coupled to said height adjustment assembly, said support column being disposed through said first aperture;
said second plate defines a second aperture and includes a second edge hingably coupled to said height adjustment assembly, said support column being disposed through said second aperture;
said biasing member is disposed to urge said first plate away from said second plate, thereby causing a portion of said first plate that defines said first aperture to engage said support column and causing a portion of said second plate that defines said second aperture to engage said support column, said engagement of said support column by said portion of said first plate and said portion of said second plate locking said height adjustment assembly in place on said support column; and
said application of force by said user moves said first plate toward said second plate, thereby causing said portion of said first plate and said portion of said second plate to disengage said support column, said disengagement of said support column by said portion of said first plate and said portion of said second plate allowing said height adjustment assembly to move along said support column.

15. The portable grill of claim 1, wherein said cooking platform is detachable from said height adjustment assembly.

16. The portable grill of claim 1, wherein said cooking platform includes a grate.

17. The portable grill of claim 1, wherein said support column includes a radial exterior surface.

18. The portable grill of claim 17, wherein
said support column is tubular;
each of said transverse stabilizers are tubular; and
said base frame is tubular.

19. The portable grill of claim 1, wherein:
said base frame includes a receiver configured to engage said proximal end of said first transverse stabilizer;
said first transverse stabilizer is rotatable about said first axis;
rotation of said transverse stabilizer causes the orientation of said first foot about said axis to change; and
change in said orientation of said first foot about said axis facilitates adjustment of an angle between said transverse stabilizer and said supporting surface.

20. A portable grill comprising:
a base frame configured to rest on a supporting surface;
a set of transverse stabilizers, each said transverse stabilizer being coupled to said base frame and extending transversely from said base frame in a different direction, said transverse stabilizers being oriented to rest upon said supporting surface;
foot means coupled to a distal end of each transverse stabilizer for providing additional stability to said portable grill;
a support column coupled to said base frame and extending from said base frame in an upward direction;
a cooking platform coupled to said support column and oriented such that a center of said cooking platform is disposed over a region of said supporting surface disposed between an adjacent pair of said transverse stabilizers; and
a height adjustment assembly selectively engageable with said platform, coupled to move up and down said support column, and configured to be selectively fixed in multiple positions along
along said support column.

* * * * *